US012755204B2

(12) United States Patent
Theocharous et al.

(10) Patent No.: US 12,755,204 B2
(45) Date of Patent: Oct. 6, 2026

(54) WARM STARTING AN ONLINE BANDIT LEARNER MODEL UTILIZING RELEVANT OFFLINE MODELS

(71) Applicant: Adobe Inc., San Jose, CA (US)

(72) Inventors: Georgios Theocharous, San Jose, CA (US); Zheng Wen, Fremont, CA (US); Yasin Abbasi Yadkori, Hanoi (VN); Qingyun Wu, Chrlottsville, VA (US)

(73) Assignee: Adobe Inc., San Jose, CA (US)

( * ) Notice: Subject to any disclaimer, the term of this patent is extended or adjusted under 35 U.S.C. 154(b) by 794 days.

(21) Appl. No.: 18/306,449

(22) Filed: Apr. 25, 2023

(65) Prior Publication Data

US 2023/0259829 A1 Aug. 17, 2023

Related U.S. Application Data

(62) Division of application No. 16/584,082, filed on Sep. 26, 2019, now Pat. No. 11,669,768.

(51) Int. Cl.
*G06F 21/00* (2013.01)
*G06F 18/21* (2023.01)
(Continued)

(52) U.S. Cl.
CPC ......... *G06N 20/00* (2019.01); *G06F 18/2193* (2023.01); *G06N 5/04* (2013.01)

(58) Field of Classification Search
CPC ....... G06F 18/2193; G06F 21/35; G06N 5/04; G06N 20/00; H04L 63/0853;
(Continued)

(56) References Cited

U.S. PATENT DOCUMENTS 6,628,786 B1 * 9/2003 Dole ..................... H04L 9/0891 380/263
10,530,991 B2 * 1/2020 Wang ..................... G06N 3/08
(Continued)

OTHER PUBLICATIONS

Abbasi-Yadkori, Y., Pal, D., and Szepesvari, C. Improved algorithms for linear stochastic bandits. In NIPS, pp. 2312-2320. 2011.
(Continued)

*Primary Examiner* — Don G Zhao
(74) *Attorney, Agent, or Firm* — Keller Preece PLLC

(57) ABSTRACT

Methods, systems, and non-transitory computer readable storage media are disclosed for utilizing offline models to warm start online bandit learner models. For example, the disclosed system can determine relevant offline models for an environment based on reward estimate differences between the offline models and the online model. The disclosed system can then utilize the relevant offline models (if any) to select an arm for the environment. The disclosed system can update the online model based on observed rewards for the selected arm. Additionally, the disclosed system can also use entropy reduction of arms to determine the utility of the arms in differentiating relevant and irrelevant offline models. For example, the disclosed system can select an arm based on a combination of the entropy reduction of the arm and the reward estimate for the arm and use the observed reward to update an observation history.

20 Claims, 9 Drawing Sheets

(51) Int. Cl.
*G06N 5/04* (2023.01)
*G06N 20/00* (2019.01)

(58) Field of Classification Search
CPC .... H04L 63/105; H04W 12/06; H04W 12/64; H04W 12/61; H04W 84/18; H04W 88/02; H04W 12/104; H04R 1/1008; H04R 1/1041
See application file for complete search history.

(56) References Cited

U.S. PATENT DOCUMENTS

| | | | | |
|---|---|---|---|---|
| 10,706,454 | B2 * | 7/2020 | Li | G06Q 30/0631 |
| 10,762,892 | B2 * | 9/2020 | Rusak | G06F 16/90332 |
| 11,009,836 | B2 * | 5/2021 | Hoffmann | G05B 13/0265 |
| 11,151,467 | B1 * | 10/2021 | Shtein | G06N 7/00 |
| 11,200,622 | B2 * | 12/2021 | Moses | G06Q 40/06 |
| 11,269,590 | B2 * | 3/2022 | Niehaus | H04L 51/216 |
| 11,367,429 | B2 * | 6/2022 | Niehaus | H04L 51/18 |
| 11,636,120 | B2 * | 4/2023 | Li | G06F 16/24578<br>707/748 |
| 2005/0080817 | A1 * | 4/2005 | Janow | G06Q 90/00 |
| 2008/0253645 | A1 * | 10/2008 | Nauck | G06N 7/023<br>382/159 |
| 2009/0037919 | A1 * | 2/2009 | Zhan | G16Z 99/00<br>718/103 |
| 2015/0082377 | A1 * | 3/2015 | Chari | H04L 63/20<br>726/1 |
| 2016/0147754 | A1 * | 5/2016 | Li | G06F 16/24578<br>707/748 |
| 2017/0213128 | A1 * | 7/2017 | Hammond | G06F 8/31 |
| 2017/0261949 | A1 * | 9/2017 | Hoffmann | G06N 7/01 |
| 2018/0220061 | A1 * | 8/2018 | Wang | G06N 3/08 |
| 2019/0068457 | A1 * | 2/2019 | Sharma | H04L 43/0817 |
| 2019/0103092 | A1 * | 4/2019 | Rusak | G06F 16/90332 |
| 2019/0303995 | A1 * | 10/2019 | Li | G06Q 30/0633 |
| 2020/0090048 | A1 * | 3/2020 | Pascanu | G06N 3/10 |
| 2020/0195652 | A1 * | 6/2020 | Carnahan | G06F 21/604 |
| 2020/0234134 | A1 * | 7/2020 | Choque | H04L 9/0643 |
| 2020/0273000 | A1 * | 8/2020 | Li | G06N 3/08 |
| 2020/0356634 | A1 * | 11/2020 | Srinivasan | G06F 40/58 |
| 2020/0387347 | A1 * | 12/2020 | Niehaus | G06F 3/167 |
| 2020/0388269 | A1 * | 12/2020 | Niehaus | G06Q 10/107 |
| 2021/0056950 | A1 * | 2/2021 | Niehaus | G10L 13/00 |
| 2021/0082051 | A1 * | 3/2021 | Moses | G06F 9/451 |
| 2022/0188895 | A1 * | 6/2022 | Lipka | G06N 5/04 |
| 2022/0343207 | A1 * | 10/2022 | Vu | G06N 20/00 |
| 2022/0355205 | A1 * | 11/2022 | Juliani, Jr. | A63F 13/42 |
| 2023/0259829 | A1 * | 8/2023 | Theocharous | G06N 5/04<br>706/12 |

OTHER PUBLICATIONS

Auer, P., Cesa-Bianchi, N., Freund, Y., and Schapire, R. E. Gambling in a rigged casino: The adversarial multi-armed bandit problem. In Foundations of Computer Science, 1995. Proceedings., 36th Annual Symposium on, pp. 322-331, 1995.

Auer, P., Cesa-Bianchi, N., and Fischer, P. Finite-time analysis of the multiarmed bandit problem. Mach. Learn., 47(2-3):235-256, May 2002. ISSN 0885-6125.

Ben-David, S., Blitzer, J., Crammer, K., Kulesza, A., Pereira, F., and Vaughan, J. W. A theory of learning from different domains. Machine learning, 79(1-2):151-175, 2010.

Bouneffouf, D., Bouzeghoub, A., and Gancarski, A. L. A contextual-bandit algorithm for mobile context-aware recommender system. In Neural Information Processing, pp. 324-331. 2012.

Chapelle, O. and Li, L. An empirical evaluation of thompson sampling. In NIPS 2011, pp. 2249-2257, 2011.

Gentile, C., Li, S., and Zappella, G. Online clustering of bandits. In ICML'14, pp. 757-765, 2014.

Gentile, C., Li, S., Kar, P., Karatzoglou, A., Zappella, G., and Etrue, E. On context-dependent clustering of bandits. In ICML'17, pp. 1253-1262, 2017.

Gittins, J. C. Bandit processes and dynamic allocation indices. Journal of the Royal Statistical Society. Series B (Methodological), pp. 148-177, 1979.

Lai, T. L. and Robbins, H. Asymptotically efficient adaptive allocation rules. Advances in applied mathematics, 6(1): 4-22, 1985.

Li, L., Chu, W., Langford, J., and Schapire, R. E. A contextual-bandit approach to personalized news article recommendation. In Proceedings of 19th WWW, pp. 661-670. ACM, 2010a.

Li, W., Wang, X., Zhang, R., Cui, Y., Mao, J., and Jin, R. Exploitation and exploration in a performance based contextual advertising system. In Proceedings of 16th SIGKDD, pp. 27-36. ACM, 2010b.

Mansour, Y., Mohri, M., and Rostamizadeh, A. Domain adaptation: Learning bounds and algorithms. arXiv preprint arXiv:0902.3430, 2009.

Radlinski, F., Kleinberg, R., and Joachims, T. Learning diverse rankings with multi-armed bandits. In Proceedings of 25th ICML, pp. 784-791. ACM, 2008.

Sharaf, A. and Daume III, H. Meta-learning for contextual bandit exploration. arXiv preprint arXiv:1901.08159, 2019.

Vanschoren, J. Meta-learning: A survey. arXiv preprint arXiv:1810.03548, 2018.

Vartak, M., Thiagarajan, A., Miranda, C., Bratman, J., and Larochelle, H. A meta-learning perspective on cold-start recommendations for items. In Guyon, I., Luxburg, U. V., Bengio, S., Wallach, H., Fergus, R., Vishwanathan, S., and Garnett, R. (eds.), Advances in Neural Information Processing Systems 30, pp. 6904-6914. Curran Associates, Inc., 2017. URL http://papers.nips.cc/paper/7266-a-meta-learning-perspective-on-cold-start-recommendations-for-items. pdf.

Yan, S., Chaudhuri, K., and Javidi, T. Active learning with logged data. In Dy, J. and Krause, A. (eds.), Proceedings of the 35th International Conference on Machine Learning, vol. 80 of Proceedings of Machine Learning Research, pp. 5521-5530, Stockholmsmssan, Stockholm.

Sweden, Jul. 10-15, 2018. PMLR.

Yue, Y. and Joachims, T. Interactively optimizing information retrieval systems as a dueling bandits problem. In Proceedings of 26th ICML, pp. 1201-1208. ACM, 2009.

Zhang, C., Agarwal, A., III, H. D., Langford, J., and Negahban, S. N. Warm-starting contextual bandits: Robustly combining supervised and bandit feedback. CoRR, abs/1901.00301, 2019. URL http://arxiv.org/abs/1901.00301.

Gupta et al. "Power contextual bandits using continual learning with Amazon SageMaker RL" Webblog, published on Aug. 29, 2019. 9 pages. (Year: 2019).

Li, Lihong , et al., "Unbiased Offline Evaluation of Contextual-bandit-based News Article Recommendation Algorithms," Proceedings of 4th ACM International Conference on Web Search and Data Mining, Feb. 2011, 10 pages. (Year: 2011).

U.S. Appl. No. 16/584,082, Aug. 1, 2022, Preinterview 1st Office Action.

U.S. Appl. No. 16/584,082, Oct. 21, 2022, 1st Action Office Action.

U.S. Appl. No. 16/584,082, Jan. 23, 2023, Notice of Allowance.

* cited by examiner

WARM STARTING AN ONLINE BANDIT LEARNER MODEL UTILIZING RELEVANT OFFLINE MODELS

CROSS-REFERENCE TO RELATED APPLICATIONS

The present application is a divisional of U.S. application Ser. No. 16/584,082, filed on Sep. 26, 2019. The aforementioned application is hereby incorporated by reference in its entirety.

BACKGROUND

Improvements to computer processing and communication technologies have led to an increase in prevalence of machine-learning across a variety of computing operations. For example, many information service systems (e.g., recommender systems) utilize machine-learning models to make data-driven decisions. To illustrate, systems can use machine-learning to analyze a plurality of available actions, including the use of multi-armed bandit models or other interactive online learning models, to select actions based on mappings between the available actions and client devices/users.

While online learning models can allow systems to balance exploration and exploitation of a search space, conventional systems that utilize such models are often inefficient and inaccurate. Specifically, conventional systems using online learning are inefficient because the conventional systems are resource expensive when generating accurate recommendations. For example, when an action space is very large (e.g., many possible actions from which the systems can select), the conventional systems typically require significant amounts of time and/or processing. More time spent on selecting actions (e.g., exploitation) results in decreased time/resources for expanding the search space (e.g., exploration)

Additionally, conventional systems that utilize online learning models are often inaccurate when generating recommendations for a particular user. In particular, conventional systems typically use online models that struggle to learn the contours or parameters of an online environment and produce a number of inaccurate recommendations in the process. Accordingly, conventional systems can produce inaccurate outputs from the online learning models due to lack of relevant information, particularly for new users. Thus, conventional recommendation systems that use online learning have a number of significant shortcomings in relation to efficiency and accuracy.

SUMMARY

One or more embodiments provide benefits and/or solve one or more of the foregoing or other problems in the art with systems, methods, and non-transitory computer readable storage media that utilizes offline models to warm start online bandit learner models. For example, in one or more embodiments, the disclosed systems utilize offline models in conjunction with an online bandit learner model to select an action from a plurality of actions. Specifically, the disclosed systems can determine whether one or more offline models are relevant to an environment by comparing reward estimates for the offline models to reward estimates for the online bandit learner model. If the difference between a given offline model and the online bandit learner model falls within a confidence band of the online bandit learner model, the disclosed systems can determine that the offline model is relevant and then use the offline model to select an action. The disclosed systems can also use the observed reward of the selected action to update the online bandit learner model.

Furthermore, in one or more embodiments, the disclosed systems can use entropy reduction-based exploration of a search space. In particular, the disclosed systems can determine the utility of individual actions in differentiating relevant and irrelevant models. For instance, the disclosed systems can determine the most informative actions for differentiating models by selecting an action with the highest entropy reduction and expected reward. Additionally, the disclosed systems can add the observed reward of the selected action to on observation history for use in selecting subsequent actions. The disclosed systems can thus improve the accuracy and efficiency of exploration and exploitation of a search space using offline and online learning models.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

Various embodiments will be described and explained with additional specificity and detail through the use of the accompanying drawings in which.

DETAILED DESCRIPTION

Figure 1:
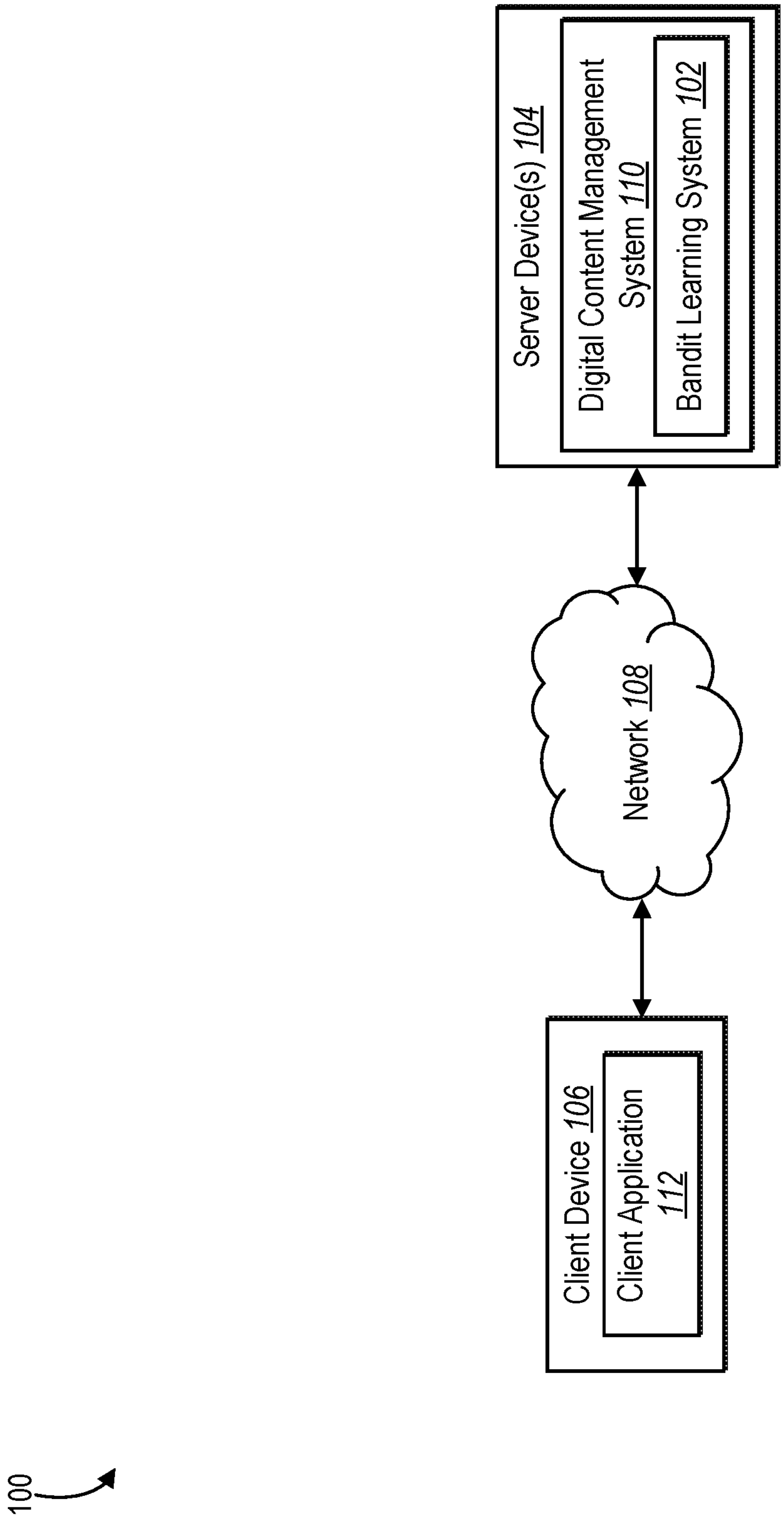
FIG. 1 illustrates an example system in which a bandit learning system can operate in accordance with one or more implementations.

One or more embodiments of the present disclosure include a bandit learning system that utilizes offline models in combination with an online bandit learner model to select and/or execute computer-implemented actions from a plurality of potential actions. For example, the bandit learning system identifies relevant offline models that generate consistent rewards on actions for a ground truth environment (e.g., ground truth characteristics or features of a client device/user). Although the ground truth environment may be unknown, the bandit learning system can use reward estimates for the environment as a baseline for comparing to reward estimates of the offline models. If one or more offline models has a consistent reward relative to the baseline (i.e., difference between offline reward estimates and the online reward estimates is within a confidence bound), the bandit learning system can utilize a relevant offline model to select an action. Otherwise, the bandit learning system can utilize the online bandit learner model to select an action. The bandit learning system can then update the online bandit learner model based on the reward of the selected action to improve the performance of the online bandit learner model.

Furthermore, in one or more embodiments, the bandit learning system can further differentiate relevant and irrelevant offline models based on entropy reduction associated with each action. For instance, the bandit learning system can determine, for a given offline model, an entropy reduction resulting from each action in a set of actions. The bandit learning system can then select an action to perform by selecting an action that has the highest combined expected reward and entropy reduction. The bandit learning system can further update an observation history of the environment based on an observed reward of the selected action.

To illustrate, in one or more embodiments, the bandit learning system can determine a set of arms corresponding to an environment. For example, bandit learning system can identify a plurality of available actions that the bandit learning system (or another system) can perform in connection with an environment (e.g., a client device/user associated with a digital content management system). For example, the bandit learning system can model a multi-armed bandit problem for selecting from the available actions to maximize the reward associated with each action selection. In particular, the bandit learning system can utilize an online bandit learner model that represents an online estimate of the environment.

Additionally, in one or more embodiments, the bandit learning system can determine whether one or more offline models are relevant to the environment for use in selecting actions. In particular, the bandit learning system can generate expected rewards for the set of actions using the online bandit learner model and the offline models. The bandit learning system can then compare the expected rewards of the offline models to the expected rewards of the online bandit learner model to determine whether the offline models generate rewards consistent with the online bandit learner model. For example, the bandit learning system can determine that relevant offline models have expected reward differences relative to the online bandit learner model that fall within a confidence bound associated with the online bandit learner model.

If the bandit learning system identifies at least one relevant offline model, the bandit learning system can use a relevant offline model to select an action. For instance, the bandit learning system can select an offline model that outputs expected rewards that are most similar to the online bandit learner model. The bandit learning system can then select an action utilizing the selected offline model. If the bandit learning system determines that there are no relevant offline models, the bandit learning system can alternatively select an action utilizing the online bandit learner model.

In one or more embodiments, after selecting an action, the bandit learning system can observe a reward of the selected action in response to the action being performed. Additionally, the bandit learning system can use the observed reward to update the online bandit learner model. Specifically, the bandit learning system can update the online bandit learner model to include information about the selected action and its corresponding reward. By updating the online bandit learner model with the reward of the selected arm, the bandit learning system can improve the accuracy of the online bandit learner model based on the selected offline model. Accordingly, the bandit learning system can select a subsequent action using the updated online learner model.

Furthermore, in one or more embodiments, the bandit learning system can utilize information about the effect of each action on entropy of an environment to use in selecting actions. Specifically, the bandit learning system can select an offline model most similar to a posterior estimate for the environment based on an observation history of the environment. For example, the bandit learning system can select an action using the offline model that results in the highest entropy reduction in combination with the expected reward of the action. After selecting the action based on the entropy reduction, the bandit learning system can update the observation history with the reward for the selected action for use in selecting subsequent models/actions.

As mentioned previously, the disclosed bandit learning system provides a number of advantages over conventional systems. For example, the bandit learning system improves the accuracy of a device or system that utilizes multi-armed bandit learning. In particular, the bandit learning system improves accuracy by adaptively using relevant offline models associated with a variety of environments to inform action selection. In contrast to conventional systems, the bandit learning system utilizes offline models to inform action selection of an online model, thus incorporating rich historical observations used in connection with other environments to provide a relevant baseline for action selection.

Additionally, the disclosed bandit learning system improves efficiency of multi-armed bandit processes by warm starting an online bandit learner model. Specifically, the bandit learning system warm starts an online bandit learner model by using existing offline models that the bandit learning system deems relevant to an environment. By using existing, relevant offline models, the bandit learning system can speed up the learning process of the online bandit learner model (e.g., increase the accumulated reward and reduce the accumulated regret of the model).

The disclosed bandit learning system can further improve the efficiency and accuracy of a multi-armed bandit process by using entropy-reduction exploration of an online model. By considering the utility of differentiating between relevant and irrelevant models when selecting actions, the bandit learning system can more accurately select offline models and more efficiently and accurately learn parameters of an online environment. The bandit learning system can thus improve the efficiency of the online model improving exploration efficiency of the online model based on the entropy reduction of available actions.

As illustrated by the foregoing discussion, the present disclosure utilizes a variety of terms to describe features and advantages of the bandit learning system. Additional detail is now provided regarding the meaning of such terms. For example, as used herein, the term "online bandit learner model" refers to an adaptive model that uses online learning for a multi-armed bandit problem (e.g., in real-time on a non-static dataset). Specifically, an online bandit learner model can include a model that attempts to improve (e.g., maximize) a reward associated with selecting an action from a set of actions (e.g., using a non-static or updating dataset). For example, an online bandit learner model can include an online linear classifier such as a linear upper confidence bound algorithm ("LinUCB") or other multi-armed bandit algorithm that utilizes expected rewards of a set of actions in making a determination of which action to select. Additionally, as used herein, the term "offline model" refers to a model that uses offline learning for an environment (e.g., on a static or previously collected dataset). In particular, an offline model can include a supervised model trained from existing users/tasks based on historical observations. In some embodiments, an offline model is a model that is not the online model (e.g., an existing model applicable to an alternative environment that is not the model being actively trained to solve the multi-armed bandit problem for the current environment).

As used herein, the terms "environment" and "ground truth environment" refer to a context associated with a multi-bandit problem. For example, an environment can include a set of characteristics, parameters, or features of a user, client device, or task for which a bandit learner model selects an arm (e.g., an action from a set of actions to perform). The environment can also include attributes or characteristics that the bandit learner model can use/estimate in determining which arm to select.

As used herein, the term "action" refers to a computer-implemented act or potential computer-implemented act. In particular, an action can include an arm in a multi-bandit arm problem. Accordingly, actions can include a set of possible events/acts that a system can perform as well as a set of selected acts/events performed by the system. For instance, an action in the context of a recommendation system can include a recommended item from a plurality of available items. Additionally, as used herein, the term "reward" refers to a (desired or measured) outcome for a selected action from a bandit learner model. For example, in the previous example of a recommendation system, a reward for an action can include a user clicking on a recommended item. As also used herein, the term "reward estimate" refers to an expected reward for an action (e.g., that has not yet been selected). To illustrate, a reward estimate can include an expectation, probability, or prediction of a user clicking on a recommended item. Also, an "online reward estimate" refers to an expected reward output from an online model, and an "offline reward estimate" refers to an expected reward output from an offline model.

As used herein, the term "entropy" refers to a measure of uncertainty in an environment. In particular, entropy can include the rate at which information is produced by a source of data. For instance, entropy can refer to the amount of information conveyed or learned by an event. To illustrate, a high entropy (e.g., a high rate of new or unexpected "information") can indicate a high level of uncertainty or disorder. A low entropy (e.g., a low rate of new or unexpected "information" for a sample) can indicate a low level of uncertainty or disorder. Entropy can be measured in a variety of ways. For example, the bandit learning system can measure entropy as the negative logarithm of a probability mass function for a value. Additionally, the term "entropy reduction" refers to a reduction of uncertainty in an environment. Accordingly, an action that reduces uncertainty in an environment reduces entropy of the environment. In one or more embodiments, as mentioned, an online bandit learner model can use entropy reduction to inform an arm selection process.

Additional detail will now be provided regarding the neural network encoding system in relation to illustrative figures portraying exemplary implementations. To illustrate, FIG. 1 includes an embodiment of a system environment 100 in which a bandit learning system 102 operates. In particular, the system environment 100 includes server device(s) 104 and a client device 106 in communication via a network 108. Moreover, as shown, the server device(s) 104 includes a digital content management system 110 including the bandit learning system 102. Additionally, the client device 106 can include a client application 112.

As shown in FIG. 1, the server device(s) 104 include the digital content management system 110. The digital content management system 110 can include a variety of systems that uses bandit learning to perform one or more tasks. For example, the digital content management system 110 can include, or be part of a recommender system that provides recommendations to client devices. To illustrate, the digital content management system 110 can provide recommendations of digital content (e.g., media recommendations), digital advertisements, content management tools, or other recommendations to one or more client devices/users. Additionally, the digital content management system 110 can manage data associated with the users/client devices based on the recommendations and operations performed by the users/client devices in connection with the recommendations.

Additionally, the digital content management system 110 includes the bandit learning system 102. In particular, the bandit learning system 102 can perform operations associated with managing a plurality of bandit learner models. For example, the bandit learning system 102 can manage an online bandit learner model for use in generating recommendations for an environment. To illustrate, the bandit learning system 102 can utilize the online bandit learner model to generate recommendations for a client device/user based on data associated with the client device/user (e.g., data maintained by the digital content management system 110 or the bandit learning system 102) and a plurality of available actions.

The bandit learning system 102 can also manage a plurality of offline bandit models associated with a plurality of additional environments for use in generating recommendations. Specifically, the bandit learning system 102 can maintain historical data associated with the additional environments corresponding to the offline bandit models. For instance, the bandit learning system 102 can identify relevant offline models from the available offline models to use in warm starting the online bandit learner model. In one or more embodiments, relevant offline models are offline models that have consistent reward across the available actions relative to the online bandit learner model.

In one or more embodiments, the bandit learning system 102 can utilize either the online bandit learner model or a relevant offline model to select an action from the plurality of available actions. For instance, the bandit learning system 102 can use a relevant offline model to select an action in response to determining that at least one of the available offline models is relevant to the environment. Alternatively, the bandit learning system 102 can use the online bandit learner model to select an action in response to determining that none of the available offline models are relevant.

The bandit learning system 102 can also manage information about actions associated with the environment. In particular, the bandit learning system 102 can maintain information about entropy reduction (and predicted entropy reduction) related to the performance of each action in connection with the environment. The bandit learning system 102 can then use the information about the entropy reduction for each action to further inform the selection of relevant offline models and actions for the environment.

In one or more embodiments, after the bandit learning system 102 has determined an action to perform based on an online bandit learner model or a relevant offline model, the bandit learning system 102 or another system (e.g., the digital content management system 110) can perform the selected action. For example, the bandit learning system 102 can inform the digital content management system 110 of the selected action (e.g., a recommendation of an item). The digital content management system 110 can then perform the selected action by sending the recommended item to the client device 106 via the network 108. While a selected action may include a recommendation of a particular item, a selected action may include a variety of tasks, as may serve a particular implementation.

In response to receiving the recommended item, the client device 106 can display the recommended item to a user via the client application 112. To illustrate, the client application 112 can include an application for viewing, managing, or otherwise interacting with digital content. For instance, the client application 112 can allow a user to view analytics data associated with digital content managed by the digital content management system 110. In one or more embodiments, a recommended item from the bandit learning system 102 includes a recommended user interface tool for the user to use in managing analytics data. Alternatively, a recommended item can include, but is not limited to, an advertisement, digital media, or other digital content.

Furthermore, the bandit learning system 102 can maintain information about the actions after performance of the actions. Specifically, the bandit learning system 102 can maintain information about rewards associated with actions performed by the bandit learning system 102 or other system (e.g., the digital content management system 110). To illustrate, the bandit learning system 102 can observe a reward (or lack of reward) for a given action based on feedback from the client device 106. The bandit learning system 102 can store the reward for the given action in a database or repository of historical observation data associated with one or more environments and/or with corresponding offline models.

In one or more embodiments, the server device(s) 104 include a variety of computing devices, including those described below with reference to FIG. 9. For example, the server device(s) 104 can include one or more servers for storing and processing data associated with multi-armed bandit models. The server device(s) 104 can also include a plurality of computing devices in communication with each other, such as in a distributed storage environment. Furthermore, the server device(s) 104 can include devices and/or components in connection with one or more online bandit learner models and/or one or more offline bandit models and data processed/output by models. In some embodiments, the server device(s) 104 comprise a content server. The server device(s) 104 can also comprise an application server, a communication server, a web-hosting server, a social networking server, a digital content campaign server, or a digital communication management server.

In addition, as shown in FIG. 1, the system environment 100 includes the client device 106. The client device 106 can include, but is not limited to, a mobile device (e.g., smartphone or tablet), a laptop, a desktop, including those explained below with reference to FIG. 9. Furthermore, although not shown in FIG. 1, the client device 106 can be operated by a user (e.g., a user included in, or associated with, the environment) to perform a variety of functions. In particular, the client device 106 can perform functions such as, but not limited to, creating, storing, uploading, downloading, viewing, and/or modifying a variety of digital content (e.g., digital videos, digital audio, and/or digital images). The client device 106 can also perform functions for requesting and displaying information associated with digital content from the digital content management system 110. For example, the client device 106 can communicate with the server device(s) 104 via the network 108 to receive information associated with the outputs of online models or offline models. Although FIG. 1 illustrates the system 100 with a single client device 106, the system 100 can include a different number of client devices.

Additionally, as shown in FIG. 1, the system 100 includes the network 108. The network 108 can enable communication between components of the system 100. In one or more embodiments, the network 108 may include the Internet or World Wide Web. Additionally, the network 108 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 104 and the client device 106 may communicate via the network using a variety of communication platforms and technologies suitable for transporting data and/or communication signals, including any known communication technologies, devices, media, and protocols supportive of data communications, examples of which are described with reference to FIG. 9.

Although FIG. 1 illustrates the server device(s) 104 and the client device 106 communicating via the network 108, the various components of the systems 100 can communicate and/or interact via other methods (e.g., the server device(s) 104 and the client device 106 can communicate directly). Furthermore, although FIG. 1 illustrates the bandit learning system 102 being implemented by a particular component and/or device within the system 100, the bandit learning system 102 can be implemented, in whole or in part, by other computing devices and/or components in the system 100 (e.g., the client device 106).

Figure 2:
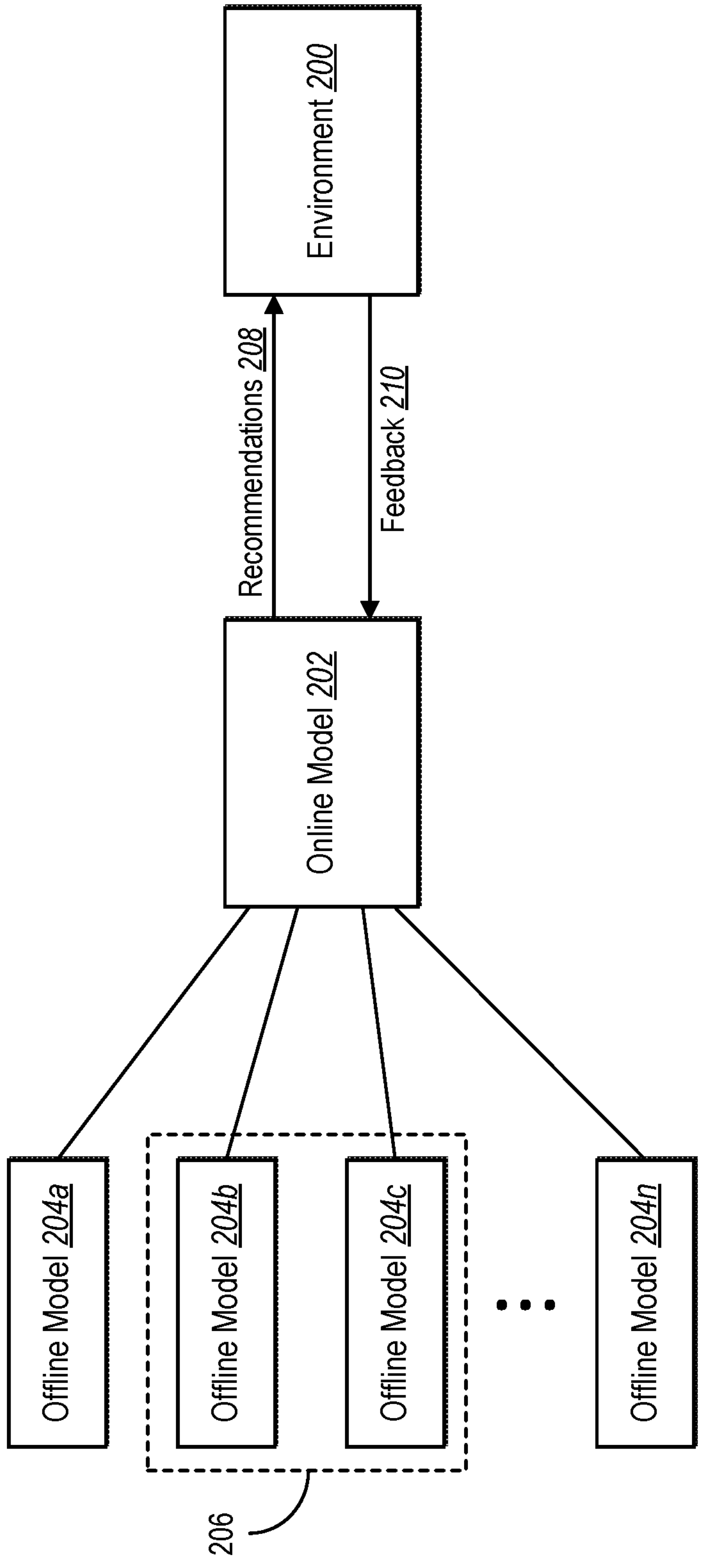
FIG. 2 illustrates a diagram of a process for bandit learning in accordance with one or more implementations.

As mentioned above, the bandit learning system 102 can adaptively utilize an online bandit learner model and a plurality of offline models to determine actions for an environment. FIG. 2 illustrates an overview of a process for bandit learning in accordance with one or more embodiments. Specifically, FIG. 2 illustrates that the bandit learning system 102 can adaptively determine whether offline models are relevant to determining actions for an environment during one or more rounds of a multi-armed bandit framework. For example, at any given iteration (or time) of applying a multi-armed bandit model, the bandit learning system 102 can make a decision based on whether one or more offline models are relevant in relation to that particular iteration (or time).

In one or more embodiments, the bandit learning system 102 uses context and action feature information to select an arm from a finite, but possibly large, arm set for an environment 200. In particular, the bandit learning system 102 makes a choice during each round of the multi-armed bandit problem by selecting an arm based on information associated with the arm and/or the environment 200. Because the environment 200 can be an unknown environment (e.g., certain parameters or preferences of the environment are unknown), the bandit learning system 102 can maintain an online model 202 that estimates the environment 200 using information collected about the environment 200, the available arms, and observed rewards for previously selected arms.

In some circumstances, when first beginning a multi-bandit process for an environment, the online model 202 may have higher uncertainty due to the lack of information collected for the environment. For example, the environment

200 can correspond to a new user of the digital content management system 110 of FIG. 1. Because the user is a new user, the bandit learning system 102 may not have reward information associated with the environment 200. Accordingly, the online model 202 may initially have a higher uncertainty in a reward confidence bound associated with the online model 202.

Due to the higher uncertainty of the online model 202, the bandit learning system 102 can determine whether to use additional information to inform arm selection. For instance, in one or more embodiments, the bandit learning system 102 can identify a plurality of existing offline models (e.g., offline models 204*a*-204*n*) corresponding to one or more other environments. As mentioned previously, the bandit learning system 102 can learn, build, and/or train the offline models 204*a*-204*n* from a set of existing environments (e.g., users). More specifically, the bandit learning system 102 may train the offline models 204*a*-204*n* using previously observed rewards associated with the corresponding environments.

In one or more embodiments, the bandit learning system 102 adaptively finds relevant models from the offline models 204*a*-204*n* to use in combination with the online model 202. In particular, the bandit learning system 102 can identify relevant offline models by comparing expected rewards of the offline models 204*a*-204*n* on all actions to the expected rewards of the online model 202. To illustrate, the bandit learning system 102 can use estimated rewards corresponding to the online model 202 as a baseline reference to determine whether an offline model is relevant.

Once the bandit learning system 102 has determined whether any of the offline models 204*a*-204*n* are relevant models (e.g., relevant models 206), the bandit learning system 102 can use the online model 202 or a relevant model to select an arm. According to one or more embodiments, selecting an arm includes providing a recommendation 208 to the environment 200 (e.g., to a user). Providing the recommendation 208 to the environment 200 results in a reward, which the bandit learning system 102 obtains as feedback 210 from the environment based on the selected arm.

The bandit learning system 102 can then use the feedback 210 including the reward for the selected arm to update the online model 202. Accordingly, the online model 202 can incorporate knowledge from the relevant models 206 for selecting subsequent arms. Thus, as the online model 202 learns from the offline models 204*a*-204*n*, the reward confidence bound of the online model 202 can change. The number of relevant offline models can also change until the confidence bound of the online model 202 causes the bandit learning system 102 to determine that the offline models are no longer relevant for selecting arms. In this manner, the bandit learning system 102 can warm start the online model 202 utilizing the offline models 204*a*-204*n*.

Figure 3:
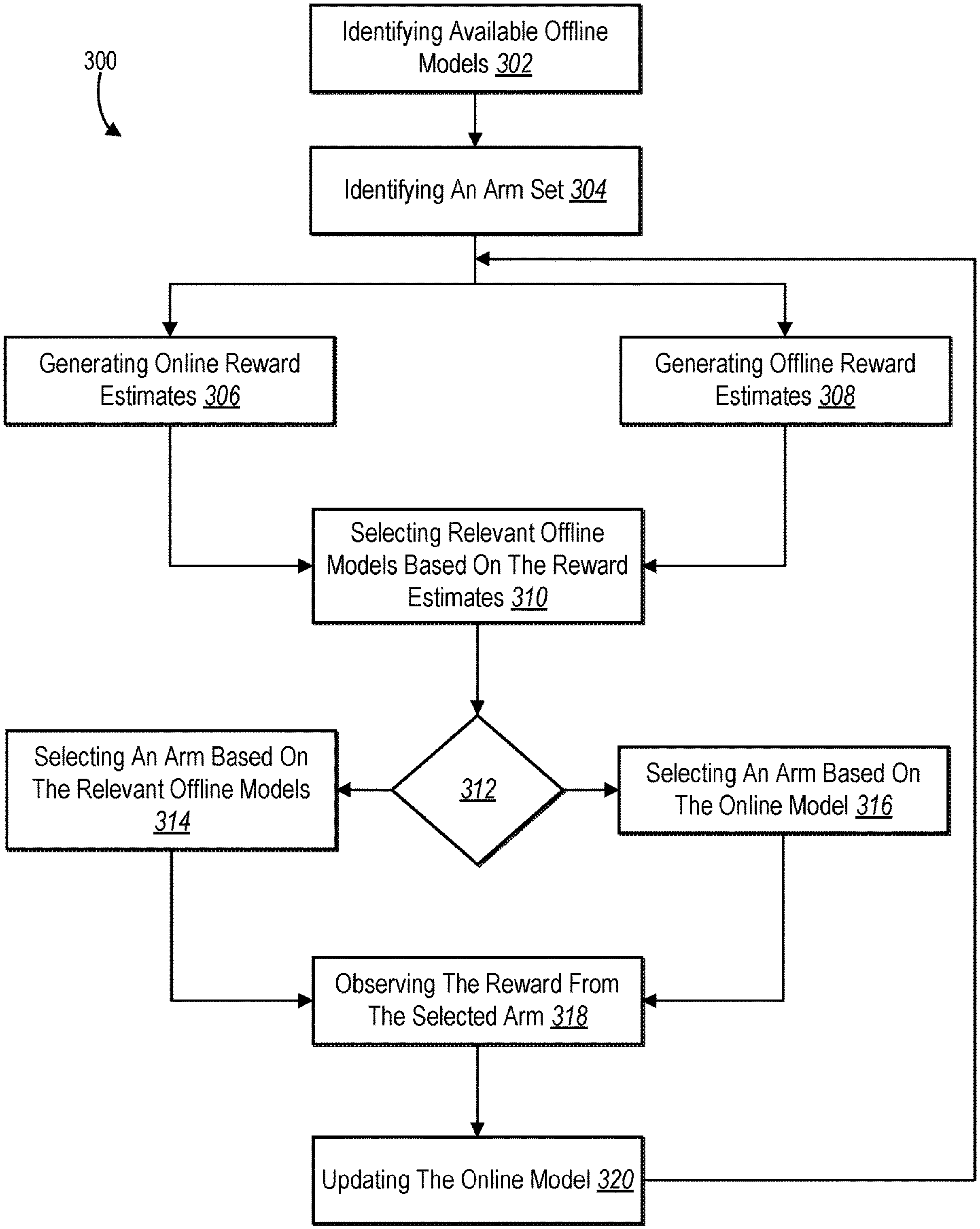
FIG. 3 illustrates a diagram of a process for using offline models to warm start online bandit learning in accordance with one or more implementations.

In connection with the bandit learning process of FIG. 2, FIG. 3 illustrates a diagram of a process for using offline models to warm start online bandit learning. Specifically, FIG. 3 illustrates a series of acts 300 for identifying offline models that are relevant to an arm selection process for an environment and then using the relevant offline models or an online bandit learner model to select an arm. FIG. 3 also illustrates using the observed reward from a selected arm to update the online model using the observed reward to improve the arm selection of the online model.

In one or more embodiments, the series of acts 300 includes an act 302 of identifying available offline models. In particular, the bandit learning system 102 can identify a plurality of offline models that correspond to a plurality of different environments. For example, the bandit learning system 102 can store and manage the offline models in connection with users or tasks for which the bandit learning system 102 previously performed bandit learning processes. Additionally, as previously mentioned, the offline models learned based on historical observations for the corresponding users/tasks. In one or more embodiments, for example, the bandit learning system 102 can use an online model to provide digital advertising content to client devices on behalf of an entity (e.g., a grocery store). The bandit learning system 102 can also access a plurality of offline models generated for a plurality of other entities. For instance, a first offline model can correspond to a general consumer products store, a second offline model can correspond to a hardware store, etc. The bandit learning system 102 can analyze the first offline model and the second offline model to determine if they are relevant to the online model, and then utilize the relevant offline model to warm start the online model.

The bandit learning system 102 can also generalize the use of the offline models by extracting information (e.g., parameters) about the environments from the offline models. The bandit learning system 102 can use the extracted information to characterize each of the offline models in a current model set. For example, the bandit learning system 102 can identify constraints, scalars, and selection policies associated with the models. The bandit learning system can then use the extracted information to identify relevant offline models for a given round in a multi-armed bandit problem.

In one or more embodiments, the series of acts 300 includes an act 304 of identifying an arm set. Specifically, the bandit learning system 102 can analyze a plurality of arms in an arm set at a given time during the bandit learning process. For example, the bandit learning system 102 can identify a plurality of actions available for the bandit learning system 102 (or other system) to perform in connection with the environment. To illustrate, the arm set can include a plurality of content items from which the bandit learning system 102 can select to provide as a recommended item to a user. Furthermore, each arm in the arm set can be associated with features that provide information about the arm.

Once the bandit learning system 102 has identified an arm set associated with an environment, the bandit learning system 102 can analyze the arms in the arm set to select an arm. In particular, the bandit learning system 102 can generate reward estimates for the arms using a plurality of bandit models. More specifically, the set of acts 300 includes an act 306 of generating online reward estimates for the arm set utilizing an online bandit learner model. To illustrate, for each arm in the arm set, the online bandit learner model can generate an expected reward based on a possible selection of the arm at a given time for the environment. Accordingly, the bandit learning system 102 can generate a plurality of online reward estimates for the arm set based on outputs of the online bandit learner model. To illustrate, the bandit learning system 102 can generate online reward estimates using one or more reward estimation methods in a multi-armed bandit problem such as a reward mapping function or an action value function.

Furthermore, the set of acts 300 includes an act 308 of generating offline reward estimates for the arm set utilizing one or more offline models. For instance, the bandit learning system 102 can use each offline model to generate a plurality of offline reward estimates that represent the expected rewards for the arms in the arm set (e.g., by utilizing an action value function). Thus, each offline model outputs an expected reward for each arm in the arm set, resulting in a plurality of groups of offline reward estimates corresponding to the plurality of offline models for the environment (e.g., a separate group of offline reward estimates for the arm set for each offline model).

The series of acts 300 further includes an act 310 of selecting relevant offline models based on the reward estimates. In particular, the bandit learning system 102 can compare the offline reward estimates of each offline model to the online reward estimates of the online bandit learner model. For example, the bandit learning system 102 can determine, for a given arm, a reward estimate difference between a corresponding offline reward estimate for the arm and a corresponding online reward estimate for the arm. The bandit learning system 102 can similarly determine reward estimate differences for all arms in the arm set for each offline model relative to the online bandit learner model.

The bandit learning system 102 can then determine whether the reward estimate differences for a particular offline model fall within the confidence bound of the online bandit learner model. In one or more embodiments, the bandit learning system 102 can determine that an offline model is relevant to the environment at the particular time if all (or a subpart of) reward estimate differences (for the available actions) corresponding to the offline model are within the confidence bound. This indicates that the offline model produces rewards consistent with the online bandit learner model. In one or more alternative embodiments, the bandit learning system 102 can determine that a threshold number or percentage of the reward estimate differences for the offline model fall within the confidence bound.

After the bandit learning system 102 determines whether the reward estimate differences of any offline models in the current model set fall within the confidence bound of the online bandit learner model, the series of acts 300 includes a decision 312 to determine whether the set of relevant models is empty. Specifically, the bandit learning system 102 can determine whether any of the offline models are relevant to the online bandit learner model. If the set of relevant models is not empty, the series of acts 300 includes an act 314 of selecting an arm based on the relevant offline models. Alternatively, if the set of relevant models is empty, the series of acts 300 includes an act 316 of selecting an arm based on the online model.

In one or more embodiments, when the set of relevant models is not empty (i.e., there exists at least one relevant offline model), the bandit learning system 102 determines which offline model to use to select an arm for the current time/round in the bandit problem. In particular, the bandit learning system 102 can determine the most relevant offline model based on the reward estimate differences of the relevant offline models. For instance, the bandit learning system 102 can determine that the offline model having the smallest reward estimate difference in the set of relevant models is the most relevant model. Accordingly, the bandit learning system 102 can select the offline model with the smallest reward estimate difference to use in selecting an arm from the arm set. Additionally, the bandit learning system 102 can use an arm selection policy of the most relevant offline model to select an arm from the arm set.

As mentioned, if the set of relevant models is empty, the bandit learning system 102 can instead use the online bandit learner model to select an arm. Specifically, an empty set of relevant models indicates that none of the offline models have reward estimate differences that fall within the confidence bound of the online model. The bandit learning system 102 can thus use the online bandit learner model in response to determining that the offline models are not relevant to the online model. The online bandit learner model can thus select an arm based on the contextual policy of the online bandit learner model. In one or more embodiments, the online bandit learner model selects an arm having the highest estimated reward in combination with the confidence bound of the online bandit learner model.

The series of acts 300 also includes an act 318 of observing the reward from the selected arm. For instance, the bandit learning system 102 can observe the reward of the selected arm based on feedback from the environment. To illustrate, the bandit learning system 102 can detect or identify interactions by a user/client device with a recommended item corresponding to the selected arm or other possible rewards associated with the selected arm.

Once the bandit learning system 102 has observed the reward for a selected arm, the series of acts 300 includes an act 320 of updating the online model. In particular, the bandit learning system 102 can update the online bandit learner model based on the observed reward for the selected arm by incorporating information about the arm (e.g., the features) and the resulting reward into the online bandit learner model. Updating the online bandit learner model allows the online bandit learner model to select arms that result in increasingly higher reward by learning the preferences or characteristics of the environment.

The bandit learning system 102 can perform an iterative process involving the series of acts 300 by continually updating the online model and selecting relevant offline models for each subsequent time period in the bandit learning process. As the online bandit learner model improves based on information from relevant offline models and observed rewards, the bandit learning system 102 may reach a point when the offline models are no longer relevant. At such time, the bandit learning system 102 can determine that the online bandit learner model is sufficiently trained to accurately select arms with higher reward for a corresponding environment relative to the offline models.

As described in the embodiment of FIG. 3, the bandit learning system 102 can perform a plurality of operations associated with using offline models to warm start an online bandit learner model. In one or more embodiments, the bandit learning system 102 uses a number of computer-implemented algorithms, described below, to perform these operations. Specifically, in contextual bandit problems, at each round $t=1, \ldots, T$, the online bandit learner model can make a choice $\alpha_t$ among a finite, but possibly large, arm set $\mathcal{A}=\{a_1, a_2, \ldots, a_K\}$. Each arm $\alpha$ is associated with a feature vector $x_\alpha \in \mathbb{R}^d$ (assuming $\|x_\alpha\|_2 \leq 1$ without loss of generality) summarizing available side-information about arm $\alpha$. After the arm selection, the model can observe the corresponding reward $r_{\alpha_t,t}$. In a stochastic setting, the bandit learning system 102 can assume that the reward of each arm is governed by a conjecture of an unknown bandit parameter $\theta^* \in \mathbb{R}^d$ (assuming $\|\theta^*\|_2 \leq 1$ without loss of generality), which characterizes the reward preference of the environment (e.g., current user). The bandit learning system 102 can determine the expected reward using a reward mapping function $f(x_\alpha, \theta^*)$ with $\mathbb{E}[r_\alpha]=f(x_\alpha, \theta^*)$.

In one or more embodiments, in addition to the environment (e.g., the current client device/user), the bandit learning system 102 has access to a set of models M that are learned from existing client devices/users. In order to make the offline models more general and extendable, the bandit learning system 102 can use a 5-tuple $$(\theta_m, C_m, \pi_m, e_m^{min}, e_m^{max})$$

to characterize each model m in the existing model set $\mathcal{M}$. Specifically, $\theta_m$ represents the primary reward generation related parameter in an offline model m. $C_m$ represents a set of constraints on the parameter space with respect to $\theta_m$ of model m. The bandit learning system 102 can assume a setting where $\theta_m$ has the same dimensionality with preference parameter $\theta^*$ of the unknown environment. $\mathbb{R}$Additionally, $C_m=\{\theta\in\mathbb{R}^d: \theta=\theta_m\}$, which is a singleton in the full parameter space. Also, $$e_m^{min} \text{ and } e_m^{max}$$

represent non-negative scalars that characterize the accuracy/relevance of the model m with the targeted unknown environment $\theta^*$. More specifically, $$e_i^{max} = \max\{|f(x_a, \theta^*) - f(x_a, \theta)|\}_{a\in\mathcal{A},\theta\in C_m} \text{ and } e_i^{min} = \min\{|f(x_a, \theta^*) - f(x_a, \theta)|\}_{a\in\mathcal{A},\theta\in C_m}.$$

$\pi_m$ represents the arm selection policy under model m, which is the optimal (or near-optimal) policy for model m. Under the reward function $f$, $$\pi_m(\mathcal{A}) = \underset{a\in\mathcal{A}}{\operatorname{argmax}} f(x_a, \theta) \text{ for } \theta \in C_m.$$

In one or more embodiments, an offline model m is considered relevant to the environment if $$e_m^{max} \le \delta(\delta > 0).$$

Additionally, an offline model m is considered irrelevant if $$e_m^{min} > \gamma(\gamma > \delta).$$

The bandit learning system 102 can assume that an offline model m is either relevant or irrelevant with respect to the environment.

Additionally, the bandit learning system 102 can maintain an online estimate $\hat{\theta}_t$ of the unknown environment $\theta^*$ by solving an objective function of a regression problem as follows:

$$\hat{\theta}_t = \underset{\theta}{\operatorname{argmin}}\left(\sum_{i=1}^{t}\left(r_{a_i,i} - f(x_{a_i}, \theta)\right)^2 + \lambda\|\theta\|_2^2\right)$$

in which $\alpha_i$ is the action selected at time i, and $\lambda$ is an 1-2 regularization hyperparameter. When the reward function is a linear function, i.e., $$f(x_a, \theta) = x_a^T\theta,$$

the bandit learning system 102 can obtain a close function solution of $\hat{\theta}_t$ with $$\hat{\theta}_t = V_t^{-1}b_{u,t},$$

in which $$V_t = \sum\nolimits_{i=1}^{t} x_{a_i,i}x_{a_i,i}^T \text{ and } b_t = \sum\nolimits_{i=1}^{t} x_{a_i}r_{a_i i}.$$

Additionally, under the assumption that, for the linear reward function and for any $\delta_0$ with probability of at least $1-\delta_0$, the online bandit learner model has a confidence bound of $|f(x_\alpha, \theta^*)-f(x_\alpha, \hat{\theta}_t)|\le CB_{t,\alpha}$ in which $$CB_{t,a} = \alpha_t\sqrt{x_a V_t^{-1} x_a} \text{ and } \alpha_t = \sqrt{d\ln\frac{\lambda+t}{\lambda\delta_0}} + \sqrt{\lambda}.$$

Furthermore, based on the confidence bound above, the bandit learning system 102 can determine that, if an offline model m is relevant to the environment, then with high probability, $\forall\alpha\in\mathcal{A}$, $|f(x_\alpha,\theta_m)-f(x_\alpha,\hat{\theta}_t)|\le CB_{t,\alpha}+\delta$. Furthermore, if the offline model m is irrelevant, then with high probability, $\forall\alpha\in\mathcal{A}$, $|f(x_\alpha, \theta_m)-f(x_\alpha, \hat{\theta}_t)|>|\gamma-CB_{t,\alpha}|$. As shown, when $\gamma-CB_{t,\alpha} > CB_{t,\alpha}+\delta$, i.e., $$CB_{t,a} < \frac{\gamma-\delta}{2},$$

there is no overlap between the identification condition of relevant and irrelevant so that models are not identified as both relevant and irrelevant. The bandit learner system 102 can thus select $CB_{t,\alpha}$ of the online bandit learner model to be small enough until the bandit learning system 102 can trust the model's identification of relevant/irrelevant offline models.

By setting the confidence bound to verify that $\forall\alpha\in\mathcal{A}$, $|f(x_\alpha, \theta_m)-f(x_\alpha, \hat{\theta}_t)|\le CB_{t,\alpha}+\delta$, the bandit learning system 102 can maintain an online estimate of the relevant model set $\mathcal{M}'_t$. Thus, when $$CB_{t,a} < \frac{\gamma-\delta}{2},$$

and the relevant model set $\mathcal{M}$ is not empty, the bandit learning system 102 can act according to the offline models based on an offline model policy $$\pi_{m_t'}(\mathcal{A})$$

selected from $$m'_t = \underset{m \in \mathcal{M}'_t}{\arg\min} \left| f(x_a, \theta_m) - f(x_a, \hat{\theta}_t) \right|.$$

Otherwise, the bandit learning system 102 can act according to the policy of the original online bandit learner model $$\text{as } a_t = \underset{a \in \mathcal{A}}{\arg\max} \left( f(\hat{\theta}_t, a) + CB_{t,a} \right).$$

Furthermore, after selecting an arm, the bandit learning system 102 can observe a reward $r_{\alpha_t}$ from the selected arm $\alpha_t$. The bandit learning system 102 can update the online bandit learner model based on the observed reward as $$\hat{\theta}_t : V_{t+1} = V_t + x_{a_t} x_{a_t}^T,\ b_{t+1} = b_t + x_{a_t} r_{a_t},\ \hat{\theta}_{t+1} = V_{t+1}^{-1} b_{t+1}.$$

Figure 4:
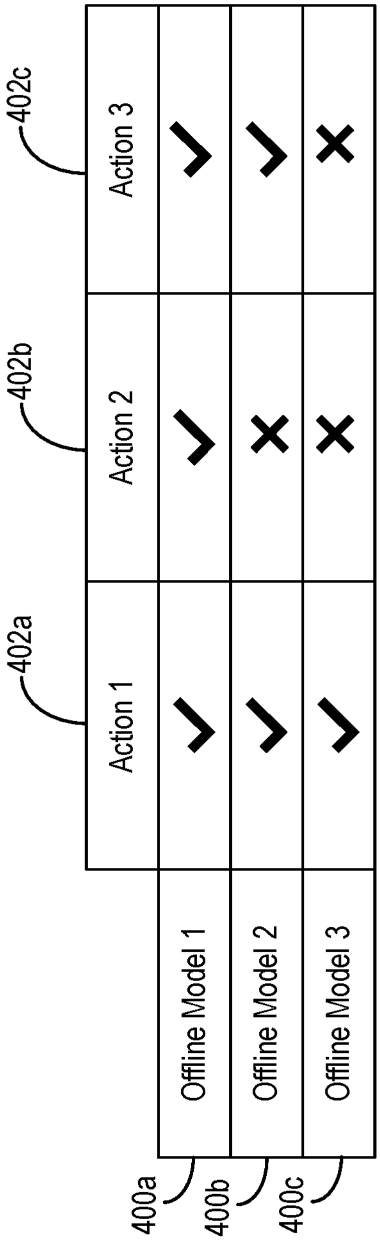
FIG. 4 illustrates a diagram of reward consistency of a plurality of offline models for a set of actions in accordance with one or more implementations.

The bandit learning system 102 can then continue selecting arms based on any relevant offline models and updating the online bandit learner model according to the observed rewards with each round of the multi-bandit problem. For example, the bandit learning system 102 can perform a plurality of computer-implemented operations outlined in Algorithm 1 below:

shown, in FIG. 4, different actions are more informative than other actions. In particular, different actions are more useful in distinguishing between the different models. For instance, a first offline model 400*a* produces consistent rewards relative to the online model for each of the set of actions 402*a*-402*c*. A second offline model 400*b* produces consistent rewards relative to the online model for a first action 402*a* and a third action 402*c*, but not for a second action 402*d*. Additionally, a third offline model 400*c* produces consistent rewards relative to the online model for the first action 402*a*, but not for the second action 402*b* or the third action 402*c*. Accordingly, the bandit learning system 102 can determine that the first action 402*a*, which has consistent rewards across all of the offline models 400*a*-400*c*, is not an informative action with regard to differentiating relevant and irrelevant models.

In contrast, the second action 402*b* and the third action 402*c* produce consistent rewards for some offline models and inconsistent rewards for other offline models. Accordingly, the bandit learning system 102 can determine that either, or both, of the second action 402*b* and the third action 402*c* is more informative with regard to differentiating relevant and irrelevant models. The bandit learning system 102 can thus use information about the actions to inform exploration on the offline models during the bandit learning process.

Figure 5:
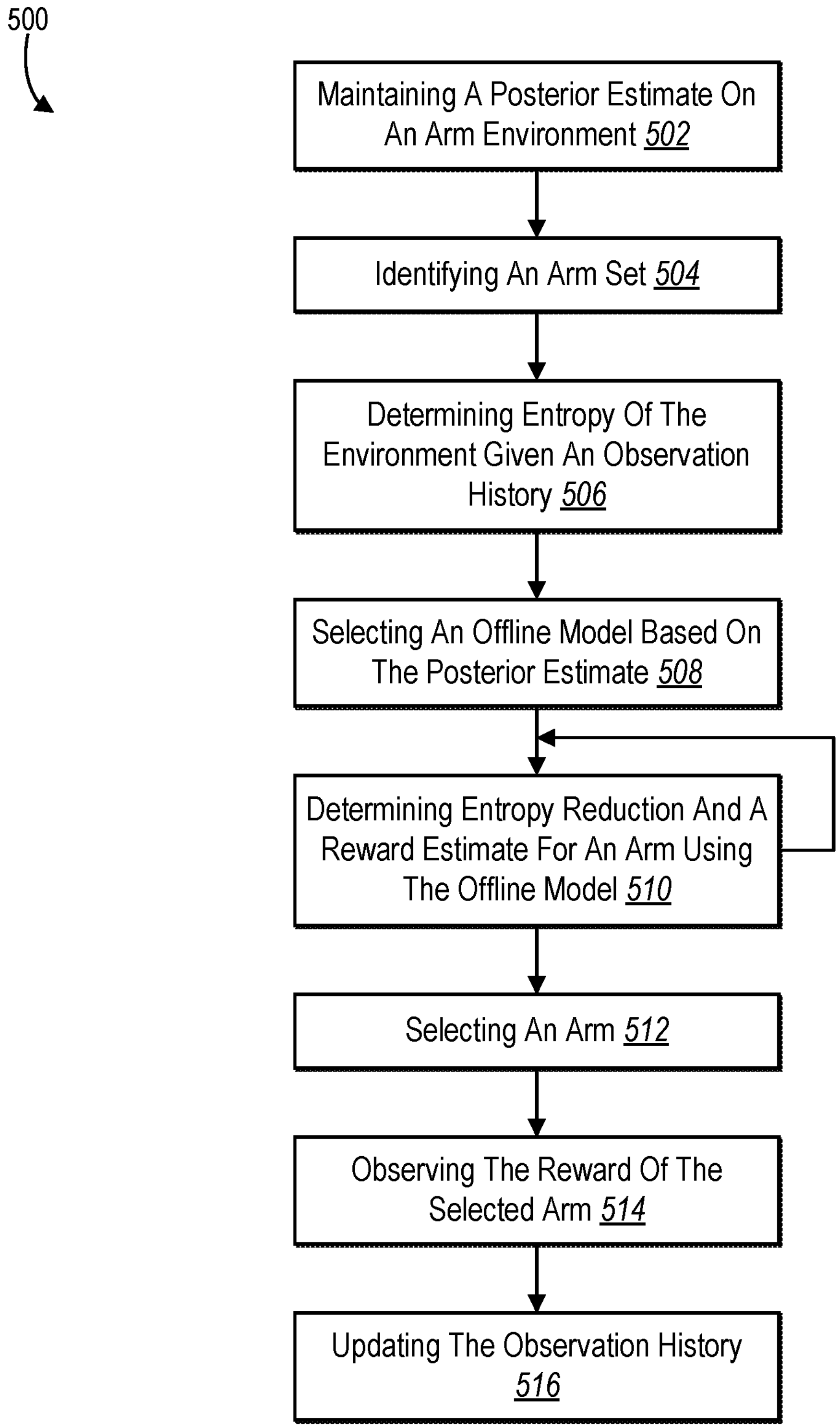
FIG. 5 illustrates a diagram of a process for entropy reduction-based exploration in bandit learning in accordance with one or more implementations.

Specifically, FIG. 5 illustrates a diagram of a process for entropy reduction-based exploration in bandit learning Algorithm 1

Input: A set of existing models $\mathcal{M}$. Model relevancy parameter $\delta > 0$ and $\gamma > \delta$.
for t = 0, 1, 2, . . . , T do
Observe the available arm set $\mathcal{A}$ along with the corresponding action features $x_a$ for $a \in \mathcal{A}_t$.
Construct a model set $\mathcal{M}'_t$ such that $\mathcal{M}'_t = \{m \in \mathcal{M}: |f(x_a, \theta_m) - f(x_a, \hat{\theta}_t)| \le$ $CB_{t,a} + \delta,\ \forall\, a \in \mathcal{A}$, in which $f(x_a, \theta) = x_a^T \theta,\ CB_{t,a} = \alpha_t \sqrt{x_a^T V_t^{-1} x_a}$ if $|\mathcal{M}'_t| \ne 0$ and $\forall$ a, $CB_{t,a} < \frac{\gamma - \delta}{2}$ then $$m'_t = \underset{m \in \mathcal{M}'_t}{\arg\min} \left| f(x_a, \theta_m) - f(x_a, \hat{\theta}_t) \right|$$

Select arm according to the policy $\pi_{m'_t}(\mathcal{A})$
else
Select arm according to the online contextual bandit learner's policy:

$$a_t = \underset{a \in \mathcal{A}}{\arg\max} \left( f(\hat{\theta}_t, a) + CB_{t,a} \right)$$

end if
Observe reward $r_{a_t}$ from the selected arm $a_t$

Update statistics about $\hat{\theta}_t : V_{t+1} = V_t + x_{a_t} x_{a_t}^T,\ b_{t+1} = b_t + x_{a_t} r_{a_t},\ \hat{\theta}_{t+1} = V_{t+1}^{-1} b_{t+1}$ end if=0

As mentioned, the bandit learning system 102 can use information about the utility of arms/actions in differentiating relevant and irrelevant models and selecting actions to perform. In this manner, the bandit learning system 102 can improve the efficiency and accuracy of systems by discouraging action selections that are not likely to result in new information. For example, FIG. 4 illustrates a diagram of different actions and the consistency of rewards relative to an online model from applying the different actions. As based on the informative concept described above. For example, FIG. 5 illustrates a series of acts 500 that use the informativeness concept to reduce an entropy of the environment to improve the efficiency of the bandit learning system 102. To illustrate, FIG. 5 illustrates that the bandit learning system 102 can use an entropy reduction associated with each arm in an arm set to determine which arm to select. The bandit learning system 102 can then use the selected arm to inform model selection during a subsequent round of a bandit learning process.

In one or more embodiments, as illustrated in FIG. 5, the series of acts 500 includes an act 502 of maintaining a posterior estimate on an arm environment. Specifically, the bandit learning system 102 can maintain a posterior estimate on the environment for each round in the bandit learning process. For instance, the bandit learning system 102 can use a historical observation set based on a previous round to determine the posterior estimate representing the environment for a current round. In one or more embodiments, the bandit learning system 102 can determine a posterior estimate of the environment by utilizing a maximum a posteriori estimator or a Bayes estimator.

Additionally, the series of acts 500 includes an act 504 of identifying an arm set. As mentioned previously, the bandit learning system 102 can identify a plurality of actions available for the bandit learning system 102 (or other system) to perform in connection with the environment. In one example, the arm set can include a plurality of content items from which the bandit learning system 102 can select to provide as a recommended item to a user. The historical observation set can include information about the arms in the arm set, including information about rewards from previous rounds of the bandit learning process.

FIG. 5 illustrates that the series of acts 500 also includes an act 506 of determining entropy of the environment given an observation history. In particular, the bandit learning system 102 can determine an uncertainty associated with the environment based on the amount and quality of available information about the environment. For example, the bandit learning system 102 can calculate an entropy for the environment at a given time (e.g., a specific round of the bandit learning process) based on the historical observation set at that time (e.g., the historical observation set generated during a previous round).

FIG. 5 further illustrates that the series of acts 500 includes an act 508 of selecting an offline model based on the posterior estimate. For instance, the bandit learning system 102 can select an offline model according to how closely the offline model represents the environment. To illustrate, the bandit learning system 102 can use the posterior estimate of the environment based on the observation history to select an offline model. More specifically, the bandit learning system 102 can maximize the posterior probability of each offline model being similar to the observation history of the environment. The bandit learning system 102 can also maintain an online model representing the environment and then determine the offline model most similar to the online model.

After selecting an offline model, the series of acts 500 includes an act 510 of determining entropy reduction and a reward estimate for an arm using the offline model. In particular, as mentioned, the entropy of the environment is representative of the amount of information known about the environment. To illustrate, more information known about the environment can result in a lower entropy (e.g., lower uncertainty), while less information can result in a higher entropy (e.g., higher uncertainty). Accordingly, the bandit learning system 102 can determine how much information an action provides about the environment based on how the action allows the bandit learning system 102 to differentiate between the various offline models. For instance, as illustrated in FIG. 4, actions that provide consistent rewards from all offline models relative to the online model provide less information (i.e., less entropy reduction) for the environment than actions that provide consistent rewards from some offline models while providing inconsistent rewards from others.

In addition to determining the entropy reduction for each arm, the bandit learning system 102 can also determine a reward estimate for each arm during each given round of the process. Specifically, the bandit learning system 102 can determine the reward estimate associated with selecting the arm given the selected model. The bandit learning system 102 can then use the reward estimate of the arm in conjunction with the calculated entropy reduction (e.g., by summing or otherwise combining the values) to determine an arm selection value. The bandit learning system 102 can repeat this process (e.g., determining arm selection values based on reward estimates and entropy reduction) for each of the arms in the arm set.

Based on the calculated arm selection values for the arms in the arm set, the series of acts 500 further includes an act 512 of selecting an arm. In one or more embodiments, the bandit learning system 102 can select an arm with the highest arm selection value. Specifically, the bandit learning system 102 can select an arm with the highest combined estimated reward and entropy reduction. Thus, the bandit learning system 102 can prioritize arms that have high entropy reduction to more quickly increase the amount of information that the bandit learning system 102 has for the environment.

The series of acts 500 includes an act 514 of observing the reward of the selected arm. For example, after the bandit learning system 102 has selected an arm, the bandit learning system 102 (or another system) can perform an action associated with the selected arm. Performing the action can result in a reward associated with the arm. To illustrate, the bandit learning system 102 can observe the reward of the arm by receiving an indication of the reward (e.g., an interaction αt a client device based on the performed action) from a client device of a user associated with the environment.

Furthermore, based on the observed reward, the series of acts 500 includes an act 516 of updating the observation history. In particular, the bandit learning system 102 can update the observation history by storing information about the observed reward with the observation history for the environment. The bandit learning system 102 can also store information about the selected arm with the observed reward. By storing the observed reward with the observation history, the bandit learning system 102 can influence subsequent model selection and arm selection, which can be dependent on the observation history.

As described with regard to FIG. 5, the bandit learning system 102 can perform a plurality of computer-implemented operations associated with entropy reduction-based exploration of offline models for use in an online bandit learning process. Specifically, the bandit learning system 102 uses the concept of action informativeness (e.g., the action's capability in differentiating models) to provide improved exploration/exploration during a bandit learning process. For example, in one or more embodiments, at each time t=1, . . . , T, the bandit learning system 102 maintains a posterior estimate on the ground truth environment $\mathbb{P}(\theta^*|O_{t-1})$ with the historical observation set $$O_{t-1} = \{(x_{a_i} r_{a_i,i})\}_{i=1}^{t-1}.$$

The bandit learning system 102 can also determine an entropy of θ* given the observation history $O_{t-1}$ as $H(\theta^*|O_{t-1})$. The new entropy of θ* after selection α and observed reward is $H(\theta^*|(\alpha,r_\alpha),O_{t-1})$. With the entropy as a measurement of information, then the information obtained by selecting action a at time t can be written as:

$$H(\theta^* \mid O_{t-1}) - H(\theta^* \mid (a, r_a), O_{t-1}) = I(\theta^*; (a, r_a) \mid O_{t-1}).$$

The bandit learning system 102 can determine that the entropy reduction is a measurement of action informativeness at time t. In particular, with an exploration target of reducing the uncertainty of θ*, the bandit learning system 102 can treat this informativeness measurement as the exploration weight on each action. The exploration weight can be the expected reward under a particular model, with a hyper-parameter c balancing the exploitation and exploration.

The bandit learning system 102 can identify the existing offline models $\mathcal{M}=\{\theta_1\}_{Ning\{1,2,\ldots,M\}}$ as candidate options of θ*. The bandit learning system 102 can apply a uniform prior on θ—i.e., $$\mathbb{P}(\theta = \theta_m) = \frac{1}{|\mathcal{M}|}$$

for $i\in\{1,2,\ldots,M\}$ given the observation history $O_0\neq 0$. The bandit learning system 102 may determine the posterior of θ* as follows:

$$\mathbb{P}(\theta^* = \theta_m|(a, r_a), O_{t-1}) = \frac{\mathbb{P}((a, r_a)|\theta^* = \theta_m)\mathbb{P}(\theta^* = \theta_m|O_{t-1})}{\sum_{m'\in\mathcal{M}}\mathbb{P}((a, r_a)|\theta^* = \theta_{m'})\mathbb{P}(\theta^* = \theta_{m'}\middle|O_{t-1})}$$

which the bandit learning system 102 can then use to determine $I(\theta^*; (\alpha, \alpha_\alpha)|O_{t-1})$, accordingly. In particular, the bandit learning system 102 can observe the available arm set $\mathbb{R}$ along with the corresponding context features $x_\alpha$ for $\alpha\in\mathbb{R}$.

Additionally, the bandit learning system 102 can select a model as $$\tilde{\theta}_t = \arg\max_{\theta\in\mathcal{M}} \mathbb{P}(\theta|O_{t-1}).$$

The bandit learning system 102 can then use the selected model to select an arm as $$a_t = \arg\max_{a\in\mathcal{A}}\left(f(x_a, \tilde{\theta}_t) + I(\theta^*; (a, f(x_a, \tilde{\theta}_t))|O_{t-1})\right).$$

Furthermore, the bandit learning system 102 can observe the reward rat and add the observation to the observation set $O_t=O_{t-1}+(\alpha_t, r_{\alpha_t})$. The bandit learning system 102 can continue selecting models, arms, and adding rewards to the observation set at each new round. In one or more embodiments, the bandit learning system 102 can perform a plurality of computer-implemented operations as shown in Algorithm 2 below:

| Algorithm 2 |
| --- |
| Input: A set of existing models $\mathcal{M} = \{\theta_1\}_{Ning\{1,2,\ldots,M\}}$. Exploit/explore hyperparameter c > 0. |
| Initalization: Observation history $O_0 \neq 0$ Prior on $\theta$: $\mathbb{P}(\theta = \theta_m) = \frac{1}{\lvert\mathcal{M}\rvert}$ |
| for i ∈ {1, 2, . . . , M}. |
| for t = 1, 2, . . . , T do |
| Observe the available arm set $\mathcal{A}$ along with the corresponding context features $x_a$ for $a \in \mathcal{A}$ |
| Select model: $\tilde{\theta}_t = \arg\max_{\theta\in\mathcal{M}} \mathbb{P}(\theta \mid O_{t-1})$ |
| Select arm: $a_t = \arg\max_{a\in\mathcal{A}}\left(f(x_a, \tilde{\theta}_t)+I(\theta^*; (a, f(x_a, \tilde{\theta}_t)) \mid O_{t-1})\right)$ |
| Observe reward $r_{a_t}$, and add the observation to the observation set $O_t = O_{t-1} + (a_t, r_{a_t})$ |
| end for=0 |

Figure 6:
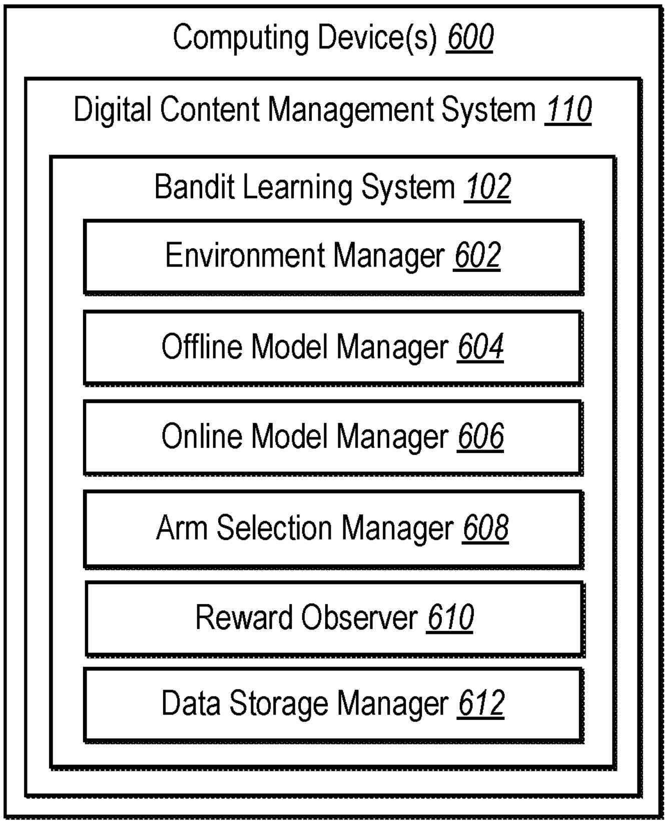
FIG. 6 illustrates a diagram of the bandit learning system of FIG. 1 in accordance with one or more implementations.

As described in relation to FIGS. 2-5, the bandit learning system 102 can perform operations for improving an online bandit learner model using offline models. The operations allow the bandit learning system 102 to efficiently and accurately select arms from a set of arms in a multi-bandit problem. FIG. 6 illustrates a detailed schematic diagram of an embodiment of the bandit learning system 102 described above. As shown, the bandit learning system 102 can be implemented in a digital content management system 110 on computing device(s) 600 (e.g., a client device and/or server device as described in FIG. 1 and as further described below in relation to FIG. 9). Additionally, the bandit learning system 102 can include, but is not limited to, an environment manager 602, an offline model manager 604, an arm selection manager 608, a reward observer 610, and a data storage manager 612. The bandit learning system 102 can be implemented on any number of computing devices. For example, the bandit learning system 102 can be implemented in a distributed system of server devices for online bandit learning. The bandit learning system 102 can also be implemented within one or more additional systems. Alternatively, the bandit learning system 102 can be implemented on a single computing device such as a single client device.

In one or more embodiments, each of the components of the bandit learning system 102 is in communication with other components using any suitable communication technologies. Additionally, the components of the bandit learning system 102 can be in communication with one or more other devices including other computing devices of a user, server devices (e.g., cloud storage devices), licensing servers, or other devices/systems. It will be recognized that although the components of the bandit learning system 102 are shown to be separate in FIG. 6, any of the subcomponents may be combined into fewer components, such as into a single component, or divided into more components as may serve a particular implementation. Furthermore, although the components of FIG. 6 are described in connection with the bandit learning system 102, at least some of the components for performing operations in conjunction with the bandit learning system 102 described herein may be implemented on other devices within the environment.

The components of the bandit learning system 102 can include software, hardware, or both. For example, the components of the bandit learning system 102 can include one or more instructions stored on a computer-readable storage medium and executable by processors of one or more computing devices (e.g., the computing device(s) 600). When executed by the one or more processors, the computer-executable instructions of the bandit learning system 102 can cause the computing device(s) 600 to perform the bandit learning operations described herein. Alternatively, the components of the bandit learning system 102 can include hardware, such as a special purpose processing device to perform a certain function or group of functions. Additionally, or alternatively, the components of the bandit learning system 102 can include a combination of computer-executable instructions and hardware.

Furthermore, the components of the bandit learning system 102 performing the functions described herein with respect to the bandit learning system 102 may, for example, be implemented as part of a stand-alone application, as a module of an application, as a plug-in for applications, as a library function or functions that may be called by other applications, and/or as a cloud-computing model. Thus, the components of the bandit learning system 102 may be implemented as part of a stand-alone application on a personal computing device or a mobile device. Alternatively, or additionally, the components of the bandit learning system 102 may be implemented in any application that allows the use of neural networks in a digital media context, including, but not limited to ADOBE® ANALYTICS, ADOBE® ANALYTICS CLOUD, ADOBE® MARKETING CLOUD, and ADOBE® TARGET software. "ADOBE," "ADOBE ANALYTICS," "ADOBE ANALYTICS CLOUD," "ADOBE MARKETING CLOUD," and "ADOBE TARGET" are registered trademarks of Adobe Systems Incorporated in the United States and/or other countries.

As mentioned, the bandit learning system 102 can include an environment manager 602 to facilitate management of environments. Specifically, the environment manager 602 can manage a plurality of environments including a plurality of existing and new users or entities in connection with a digital content management system or a recommendation system. To manage the environments, the environment manager 602 can maintain information about each environment, including profiles for the environments (e.g., use profiles), preferences, prior actions, and other contextual information that the bandit learning system 102 can use in the bandit learning process.

The bandit learning system 102 can also include an offline model manager 604. The offline model manager 604 can manage a plurality of offline models associated with a plurality of environments. The offline model manager 604 can maintain an offline model for each existing environment associated with the environment manager 602. The offline models can include a variety of supervised models (e.g., machine-learning, regression) based on observed reward data for selected arms associated with the existing environments (e.g., historical observation data for the environments). In some embodiments, for example, the offline models can include, decision trees, neural networks, Bayesian models, support vector machines, matrix factorization models, or factorization machines.

Additionally, the bandit learning system 102 can include an online model manager 606 for managing online models associated with new environments (e.g., new users). For instance, the online model manager 606 can manage one or more online bandit learner models that provide arm-selection in a bandit learning process. The online model manager 606 can also obtain information about new users for use in improving the corresponding online models. The online model manager 606 can further use information from offline models (e.g., by communicating with the offline model manager 604) to improve the online models.

Furthermore, the bandit learning system 102 can include an arm selection manager 608 to facilitate the selections of arms using online models and/or offline models. For example, the arm selection manager 608 can select arms by first determining which model to use (e.g., an online bandit learner model or an offline model) during arm selection in a round of a multi-bandit problem. The arm selection manager 608 can then use the selected model to select an arm according to an arm selection policy of the selected model. Additionally, the arm selection manager 608 can use information associated with an entropy reduction and reward estimate of one or more arms in an arm set in determining which arm to select.

The bandit learning system 102 can also include a reward observer 610 to observe rewards associated with selected arms. For example, after the arm selection manager 608 has selected an arm to be performed, the reward observer 610 can observe a reward associated with the selected arm. To illustrate, the reward observer 610 can cause the bandit learning system 102 to communicate with one or more client devices or the one or more systems and request information associated with interactions or other rewards corresponding to the selected arm. The reward observer 610 can thus identify interactions with, or based on, a selected arm at a client device via another system.

Additionally, bandit learning system 102 also includes a data storage manager 612 (that comprises a non-transitory computer memory/one or more memory devices) that stores and maintains data associated with a multi-bandit problem for a plurality of environments. For example, the data storage manager 612 can store information associated with the environments, offline models, online models, and observation data. The data storage manager 612 can also store information associated with the digital content management system 110, including content to provide in connection with perform an action (e.g., based on a selected arm).

Figure 7:
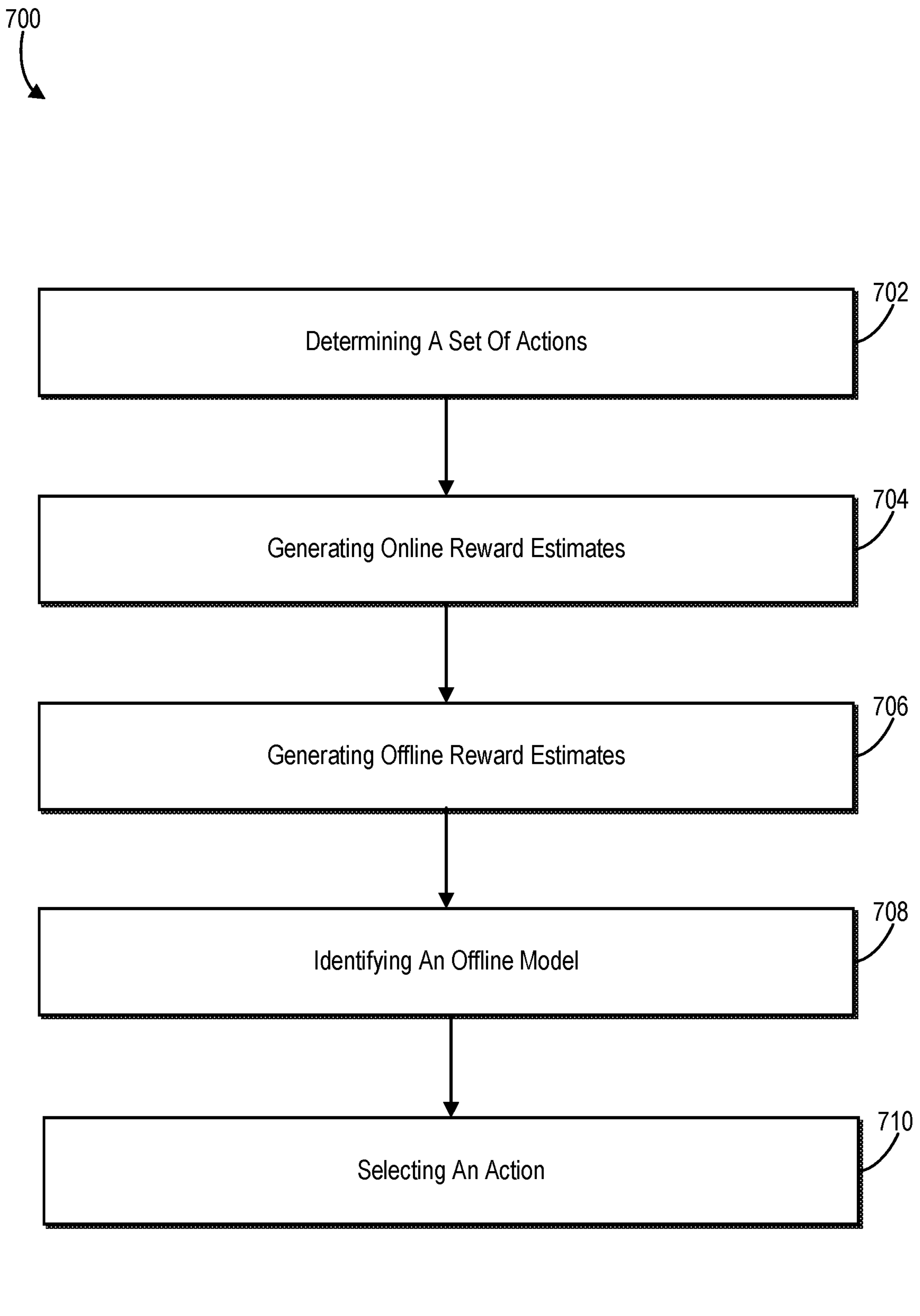
FIG. 7 illustrates a flowchart of a series of acts for using offline models to warm start online bandit learning in accordance with one or more implementations.

Turning now to FIG. 7, this figure shows a flowchart of a series of acts 700 of using offline models to warm start online bandit learning. While FIG. 7 illustrates acts according to one embodiment, alternative embodiments may omit, add to, reorder, and/or modify any of the acts shown in FIG. 7. The acts of FIG. 7 can be performed as part of a method. Alternatively, a non-transitory computer readable medium can comprise instructions, that when executed by one or more processors, cause a computing device to perform the acts of FIG. 7. In still further embodiments, a system can perform the acts of FIG. 7.

As shown, the series of acts 700 includes an act 702 of determining a set of actions. For example, act 702 involves determining, for an online bandit learner model, a set of actions corresponding to an environment. Act 702 can involve determining feature vectors including information about the set of actions.

The series of acts 700 also includes an act 704 of generating online reward estimates. For example, act 704 involves generating online reward estimates of the environment for the set of actions using the online bandit learner model. Act 704 can involve predicting rewards for the set of actions based on the feature vectors using the online bandit learner model.

Additionally, the series of acts 700 includes an act 706 of generating offline reward estimates. For example, act 706 involves generating offline reward estimates for the set of actions across a plurality of offline models. Act 706 can involve predicting rewards for the set of actions based on the feature vectors across the plurality of offline models.

The series of acts 700 further includes an act 708 of identifying an offline model. For example, act 708 involves identifying an offline model from the plurality of offline models based on the online reward estimates and the offline reward estimates. Act 708 can involve determining that the offline model has consistent rewards with the online model on the set of actions. For instance, act 708 can involve determining, for each action of the set of actions in connection with the offline model, a reward estimate difference between a corresponding online reward estimate and a corresponding offline reward estimate. Act 708 can involve applying a confidence bound corresponding to the online bandit learner model to the difference between the online reward estimate and the offline reward estimates for the offline model. Act 708 can then involve determining, for each action of the set of actions in connection with the offline model, that the reward estimate difference is within a confidence bound corresponding to the online bandit learner model. Act 708 can also involve determining that the offline model has a smallest reward estimate difference across the set of actions.

Act 708 can also involve determining two or more offline models having reward estimate differences within the confidence bound. Act 708 can then involve selecting, from the two or more offline models, the offline model based on the offline model having a smallest reward estimate difference.

The series of acts 700 also includes an act 710 of selecting an action. For example, act 710 involves selecting an action to perform from the set of actions utilizing the offline model. Act 710 can involve selecting the action to perform based on an action selection policy associated with the offline model. As part of act 710, or as an additional act, the series of acts 700 can include performing the selected action by providing, to a client device, a recommendation based on the selected action.

The series of acts 700 can also include determining, in response to the selected action being performed, a reward associated with the selected action. The series of acts 700 can then include updating the online bandit learner model based on the determined reward associated with the selected action.

Based on the updated online bandit learning model, the series of acts 700 can include determining that no offline models are relevant to the environment for selecting an additional action. For example, the series of acts 700 can include determining that reward estimate differences for the plurality of offline models are outside the confidence bound. The series of acts 700 can also include selecting the additional action to perform from the set of actions utilizing the updated online bandit learner model. For example, the series of acts 700 can include selecting the additional action based on determining that the additional action has a highest online reward estimate in connection with a confidence bound of the updated online bandit learner model.

The series of acts 700 can also include generating additional online reward estimates of the environment for the set of actions utilizing the updated online bandit learner model. The series of acts 700 can then include identifying an additional offline model from the plurality of offline models based on the additional online reward estimates. Furthermore, the series of acts 700 can include selecting an additional action to perform utilizing the additional offline model.

Figure 8:
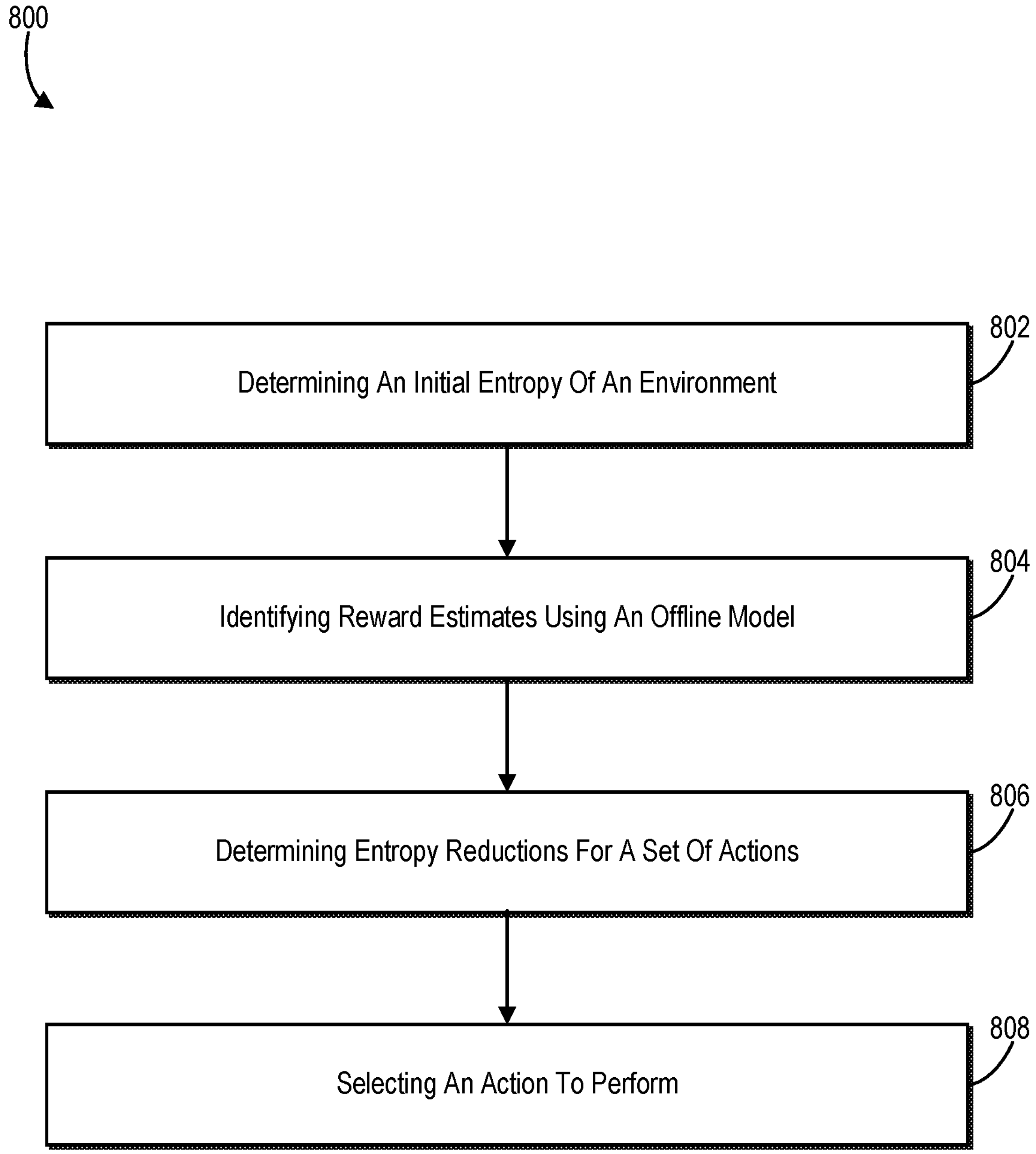
FIG. 8 illustrates a flowchart of a series of acts for entropy reduction-based exploration in bandit learning in accordance with one or more implementations.

Turning now to FIG. 8, this figure shows a flowchart of a series of acts 800 of entropy reduction-based exploration in bandit learning. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer readable medium can comprise instructions, that when executed by one or more processors, cause a computing device to perform the acts of FIG. 8. In still further embodiments, a system can perform the acts of FIG. 8.

As shown, the series of acts 800 includes an act 802 of determining an initial entropy of an environment. For example, act 802 involves determining an initial entropy of an environment based on an observation history for the environment. Act 802 can involve determining the initial entropy as an uncertainty of the environment based on the observation history at a given time.

The series of acts 800 also includes an act 804 of identifying reward estimates using an offline model. For example, act 804 involves identifying, using an offline model, reward estimates associated with performing a set of actions corresponding to the environment. Act 804 can involve predicting rewards for the set of actions based on feature vectors of the set of actions using the offline model. Act 804 can also involve selecting the offline model based on the observation history for the environment at the given time.

Additionally, the series of acts 800 includes an act 806 of determining entropy reductions for a set of actions. For example, act 806 involves determining, based on the reward estimates, entropy reductions for the set of actions. Act 806 can also involve setting, for an identified action of the set of actions, an entropy reduction at a given time as an exploration weight on the identified action and a reward estimate as an exploitation weight on the identified action.

As part of act 806, or as an additional act, the series of acts 800 can include determining, for an action of the set of actions, a new entropy of the environment based on a reward estimate associated with performing the action. The series of acts 800 can also include determining an entropy reduction for the action of the set of actions by comparing the new entropy to the initial entropy of the environment.

The series of acts 800 also includes an act 808 of selecting an action to perform. For example, act 808 involves selecting, based on the entropy reductions for the set of actions, an action to perform from the set of actions using the offline model. Act 808 can also include determining that the entropy reduction for the action has a highest entropy reduction in the set of actions.

As an additional act, the series of acts 800 can also include updating the observation history for the environment by adding an observation of a reward associated with performing the selected action to the observation history. The series of acts 800 can then include using the updated observation history to select an additional model and select an additional action from the set of actions using the additional model at a subsequent time based on an updated entropy reduction for the additional action.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
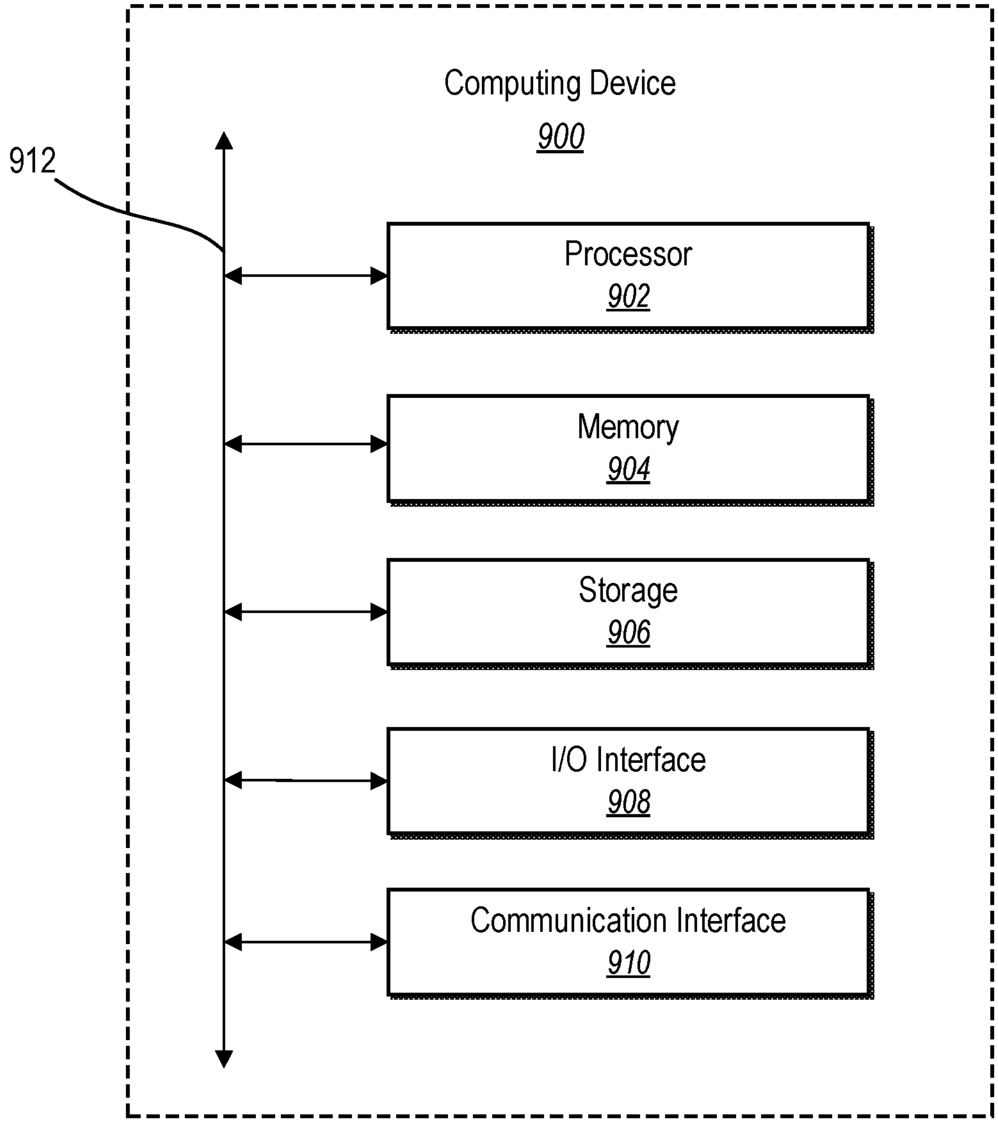
FIG. 9 illustrates a block diagram of an exemplary computing device in accordance with one or more embodiments.

FIG. 9 illustrates a block diagram of exemplary computing device 900 that may be configured to perform one or more of the processes described above. One will appreciate that one or more computing devices such as the computing device 900 may implement the system(s) of FIG. 1. As shown by FIG. 9, the computing device 900 can comprise a processor 902, a memory 904, a storage device 906, an I/O interface 908, and a communication interface 910, which may be communicatively coupled by way of a communication infrastructure 912. In certain embodiments, the computing device 900 can include fewer or more components than those shown in FIG. 9. Components of the computing device 900 shown in FIG. 9 will now be described in additional detail.

In one or more embodiments, the processor 902 includes hardware for executing instructions, such as those making up a computer program. As an example, and not by way of limitation, to execute instructions for dynamically modifying workflows, the processor 902 may retrieve (or fetch) the instructions from an internal register, an internal cache, the memory 904, or the storage device 906 and decode and execute them. The memory 904 may be a volatile or non-volatile memory used for storing data, metadata, and programs for execution by the processor(s). The storage device 906 includes storage, such as a hard disk, flash disk drive, or other digital storage device, for storing data or instructions for performing the methods described herein.

The I/O interface 908 allows a user to provide input to, receive output from, and otherwise transfer data to and receive data from computing device 900. The I/O interface 908 may include a mouse, a keypad or a keyboard, a touch screen, a camera, an optical scanner, network interface, modem, other known I/O devices or a combination of such I/O interfaces. The I/O interface 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 908 is configured to provide graphical data to a display for presentation to a user. The graphical data may be representative of one or more graphical user interfaces and/or any other graphical content as may serve a particular implementation.

The communication interface 910 can include hardware, software, or both. In any event, the communication interface 910 can provide one or more interfaces for communication (such as, for example, packet-based communication) between the computing device 900 and one or more other computing devices or networks. As an example, and not by way of limitation, the communication interface 910 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 910 may facilitate communications with various types of wired or wireless networks. The communication interface 910 may also facilitate communications using various communication protocols. The communication infrastructure 912 may also include hardware, software, or both that couples components of the computing device 900 to each other. For example, the communication interface 910 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A method comprising to:

determining an initial entropy of an environment based on an observation history for the environment, the environment comprising context associated with a multi-bandit problem;

identifying, using an offline model of a plurality of offline models, reward estimates associated with performing a set of computer-implemented tasks corresponding to the environment;

determining entropy reductions for the set of computer-implemented tasks by determining how much information each computer-implemented task from the set of computer-implemented tasks provides about the environment based on how each computer-implemented task differentiates between the plurality of offline models; and selecting, based on the reward estimates and the entropy reductions for the set of computer-implemented tasks, a computer-implemented task to perform from the set of computer-implemented tasks using the offline model.

2. The method as recited in claim 1, wherein determining the entropy reductions comprises:

determining, for a given computer-implemented task of the set of computer-implemented tasks, a new entropy of the environment based on a reward estimate associated with performing the computer-implemented task; and determining an entropy reduction for the computer-implemented task of the set of computer-implemented tasks by comparing the new entropy to the initial entropy of the environment.

3. The method as recited in claim 1, wherein selecting the computer-implemented task to perform comprises:

determining task selection values for the set of computer-implemented tasks by combining values associated with the reward estimates and values associated with the entropy reductions; and determining that the computer-implemented task to perform comprises a higher task selection value than other computer-implemented tasks of the set of computer-implemented tasks.

4. The method as recited in claim 1, further comprising updating the observation history for the environment by adding an observation of a reward associated with performing the selected computer-implemented task to the observation history.

5. The method as recited in claim 1, further comprising setting, for an identified computer-implemented task of the set of computer-implemented tasks, an entropy reduction at a given time as an exploration weight on the identified computer-implemented task and a reward estimate as an exploitation weight on the identified computer-implemented task.

6. The method as recited in claim 1, further comprising:

generating online reward estimates of the environment for the set of computer-implemented tasks using an online bandit learner model;

generating offline reward estimates for the set of computer-implemented tasks across the plurality of offline models; and determining that the offline model is relevant to the online bandit learner model based on the online reward estimates and the offline reward estimates.

7. The method as recited in claim 6, wherein determining that the offline model is relevant to the online bandit learner model comprises:

comparing the online reward estimates to the offline reward estimates; and determining that the offline model is relevant to the online bandit learner model based on a difference of the offline reward estimates across the set of computer-implemented tasks relative to the online reward estimates of the online bandit learner model.

8. A non-transitory computer readable medium comprising instructions that, when executed by at least one processor, cause the at least one processor to perform operations comprising:

determining an initial entropy of an environment based on an observation history for the environment, the environment comprising context associated with a multi-bandit problem;

identifying, using an offline model of a plurality of offline models, reward estimates associated with performing a set of computer-implemented tasks corresponding to the environment;

determining, entropy reductions for the set of computer-implemented tasks by determining how much information each computer-implemented task from the set of computer-implemented tasks provides about the environment based on how each computer-implemented task differentiates between the plurality of offline models; and selecting, based on the reward estimates and the entropy reductions for the set of computer-implemented tasks, a computer-implemented task to perform from the set of computer-implemented tasks using the offline model.

9. The non-transitory computer readable medium as recited in claim 8, wherein determining the entropy reductions comprises:

determining, for a given computer-implemented task of the set of computer-implemented tasks, a new entropy of the environment based on a reward estimate associated with performing the computer-implemented task; and determining an entropy reduction for the computer-implemented task of the set of computer-implemented tasks by comparing the new entropy to the initial entropy of the environment.

10. The non-transitory computer readable medium as recited in claim 8, wherein selecting the computer-implemented task to perform comprises:

determining task selection values for the set of computer-implemented tasks by combining values associated with the reward estimates and values associated with the entropy reductions; and determining that the computer-implemented task to perform comprises a higher task selection value than other computer-implemented tasks of the set of computer-implemented tasks.

11. The non-transitory computer readable medium as recited in claim 8, wherein the operations further comprise updating the observation history for the environment by adding an observation of a reward associated with performing the selected computer-implemented task to the observation history.

12. The non-transitory computer readable medium as recited in claim 8, wherein the operations further comprise setting, for an identified computer-implemented task of the set of computer-implemented tasks, an entropy reduction at a given time as an exploration weight on the identified computer-implemented task and a reward estimate as an exploitation weight on the identified computer-implemented task.

13. The non-transitory computer readable medium as recited in claim 8, wherein the operations further comprise:

generating online reward estimates of the environment for the set of computer-implemented tasks using an online bandit learner model;

generating offline reward estimates for the set of computer-implemented tasks across the plurality of offline models; and determining that the offline model is relevant to the online bandit learner model based on the online reward estimates and the offline reward estimates.

14. The non-transitory computer readable medium as recited in claim 13, wherein determining that the offline model is relevant to the online bandit learner model comprises:

comparing the online reward estimates to the offline reward estimates; and determining that the offline model is relevant to the online bandit learner model based on a difference of the offline reward estimates across the set of computer-implemented tasks relative to the online reward estimates of the online bandit learner model.

15. A system comprising:

one or more memory devices; and one or more servers coupled to the one or more memory devices that cause the system to:

determine an initial entropy of an environment based on an observation history for the environment, the environment comprising context associated with a multi-bandit problem;

identify, using an offline model of a plurality of offline models, reward estimates associated with performing a set of computer-implemented tasks corresponding to the environment;

determine entropy reductions for the set of computer-implemented tasks by determining how much information each computer-implemented task from the set of computer-implemented tasks provides about the environment based on how each computer-implemented task differentiates between the plurality of offline models; and select, based on the reward estimates and the entropy reductions for the set of computer-implemented tasks, a computer-implemented task to perform from the set of computer-implemented tasks using the offline model.

16. The system as recited in claim 15, wherein the one or more servers are configured to cause the system to determine the entropy reductions by:

determining, for a given computer-implemented task of the set of computer-implemented tasks, a new entropy of the environment based on a reward estimate associated with performing the computer-implemented task; and determining an entropy reduction for the computer-implemented task of the set of computer-implemented tasks by comparing the new entropy to the initial entropy of the environment.

17. The system as recited in claim 15, wherein the one or more servers are configured to cause the system to select the computer-implemented task to perform comprises:

determining task selection values for the set of computer-implemented tasks by combining values associated with the reward estimates and values associated with the entropy reductions; and determining that the computer-implemented task to perform comprises a higher task selection value than other computer-implemented tasks of the set of computer-implemented tasks.

18. The system as recited in claim 16, wherein the one or more servers are further configured to cause the system to update the observation history for the environment by adding an observation of a reward associated with performing the selected computer-implemented task to the observation history.

19. The system as recited in claim 16, wherein the one or more servers are further configured to cause the system to set, for an identified computer-implemented task of the set of computer-implemented tasks, an entropy reduction at a given time as an exploration weight on the identified computer-implemented task and a reward estimate as an exploitation weight on the identified computer-implemented task.

20. The system as recited in claim 16, wherein the one or more servers are further configured to cause the system to:

generate online reward estimates of the environment for the set of computer-implemented tasks using an online bandit learner model;

generate offline reward estimates for the set of computer-implemented tasks across the plurality of offline models; and determine that the offline model is relevant to the online bandit learner model based on the online reward estimates and the offline reward estimates.

* * * * *